United States Patent
Quennesson

(10) Patent No.: US 10,474,717 B2
(45) Date of Patent: Nov. 12, 2019

(54) LIVE VIDEO STREAMING SERVICES WITH MACHINE-LEARNING BASED HIGHLIGHT REPLAYS

(71) Applicant: Twitter, Inc., San Francisco, CA (US)

(72) Inventor: Kevin Quennesson, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/655,302

(22) Filed: Jul. 20, 2017

(65) Prior Publication Data

US 2018/0025078 A1 Jan. 25, 2018

Related U.S. Application Data

(60) Provisional application No. 62/365,371, filed on Jul. 21, 2016.

(51) Int. Cl.
*H04N 21/45* (2011.01)
*G06F 16/70* (2019.01)
(Continued)

(52) U.S. Cl.
CPC .............. *G06F 16/70* (2019.01); *G06F 16/00* (2019.01); *G06N 20/00* (2019.01); *G11B 27/031* (2013.01); *H04N 21/4788* (2013.01); *H04N 21/8549* (2013.01); *G06F 3/00* (2013.01); *G06F 17/00* (2013.01)

(58) Field of Classification Search
None
See application file for complete search history.

(56) References Cited

U.S. PATENT DOCUMENTS 8,311,950 B1 11/2012 Kunal et al.
8,452,778 B1 5/2013 Song et al.
(Continued)

FOREIGN PATENT DOCUMENTS

WO 2011009101 A1 1/2011

OTHER PUBLICATIONS

Brezeale, et al., "Automatic Video Classification: A Survey of the Literature", IEEE Transactions on Systems, Man, and Cybernetics, vol. 38, Issue 3, May 2008, 16 pages.
(Continued)

*Primary Examiner* — Cai Y Chen
(74) *Attorney, Agent, or Firm* — Brake Hughes Bellermann LLP

(57) ABSTRACT

According to an implementation, a computing device for automatically creating video highlights for video broadcast streams shared in a social media platform includes at least one processor, and a non-transitory computer-readable medium having executable instructions that when executed by the at least one processor are configured to execute a video broadcasting service having a video highlight creator. The video highlight creator is configured to obtain a video broadcast stream that was previously broadcasted to a plurality of viewing devices of the social media platform, create video highlights based on an analysis of the video broadcast stream, and provide the video highlights for selection within a user interface of an interactive streaming application configured to communicate with the video broadcasting service over a network.

18 Claims, 12 Drawing Sheets

(51) Int. Cl.
*G06N 20/00* (2019.01)
*G06F 16/00* (2019.01)
*G11B 27/031* (2006.01)
*H04N 21/4788* (2011.01)
*H04N 21/8549* (2011.01)
*G06F 3/00* (2006.01)
*G06F 17/00* (2019.01)

(56) References Cited

U.S. PATENT DOCUMENTS

| | | |
|---|---|---|
| 9,361,377 B1 | 6/2016 | Azari et al. |
| 2012/0039539 A1 | 2/2012 | Boiman et al. |
| 2012/0059825 A1 | 3/2012 | Fishman et al. |
| 2012/0089681 A1 | 4/2012 | Chowdhury et al. |
| 2013/0007787 A1* | 1/2013 | John ............... H04N 21/42203 725/10 |
| 2013/0080159 A1 | 3/2013 | Sharifi et al. |
| 2013/0105743 A1* | 5/2013 | Owen ................ C09D 11/50 252/586 |
| 2013/0167168 A1* | 6/2013 | Ellis .................. H04N 5/44543 725/12 |
| 2014/0278308 A1 | 9/2014 | Liu et al. |
| 2015/0095329 A1 | 4/2015 | Freund et al. |
| 2015/0363635 A1 | 12/2015 | Suri et al. |
| 2015/0365725 A1 | 12/2015 | Baronshin et al. |
| 2016/0105734 A1* | 4/2016 | Packard ........... H04N 21/25841 725/32 |

OTHER PUBLICATIONS

Gauch, et al., "Real Time Video Scene Detection and Classification", Information Processing and Management 35, 1999, pp. 381-400.

Mei, et al., "Contextual Video Recommendation by Multimodal Relevance and User Feedback", ACM Transactions on Information Systems, vol. 29, No. 2, Apr. 2011, pp. 1-24.

Mittal, et al., "Automatic content-based retrieval and semantic classification of video content", International Journal on Digital Libraries, Springer, Berlin, DE, vol. 6, No. 1, 2006, pp. 30-38.

International Search Report and Written Opinion for PCT Application No. PCT/US2017/026014, dated Jun. 26, 2017, 14 pages.

International Search Report and Written Opinion for PCT Application No. PCT/US2017/043077, dated Sep. 27, 2017, 13 pages.

International Preliminary Report on Patentability for International Application No. PCT/US2017/043077, dated Jan. 31, 2019, 10 pages.

* cited by examiner

Total – 100
Hide.Selfie – 56.62
Hide.Noise – 8.4
Hide.Noise.Dark – 7.93
Hide.Noise.Indoor – 5.96
Hide.Screen – 4.98
Hide.Driving – 4.63
Hide.NSFW.risky – 3.14
Show.Talk – 1.31
Show.Stage – 1.07
Hide.NSFW.porn – 0.93
Hide.Children – 0.83
Show.Food – 0.68
Show.Sport – 0.66
Show.Urban – 0.61
Show.Outdoor – 0.59
Show.Animal – 0.54
Show.Unplugged – 0.53
Show.Live – 0.25
Hide.Texte – 0.22
Show.Art – 0.14

FIG. 2

LIVE VIDEO STREAMING SERVICES WITH MACHINE-LEARNING BASED HIGHLIGHT REPLAYS

RELATED APPLICATION

This application is a non-provisional of, and claims priority to U.S. Provisional Application No. 62/365,371 filed Jul. 21, 2016, entitled "Live Video Streaming Services with Machine-Learning Based Highlight Replays", the disclosure of which is incorporated herein in its entirety.

BACKGROUND

An interactive video broadcasting service may allow a broadcaster to share a live broadcast with a plurality of viewers in a social media platform. Also, the live broadcast may be stored on a server computer so that users can replay the broadcast. As more and more users register and join the interactive video broadcasting service, the number of video broadcast streams that can be selected and viewed may increase dramatically.

SUMMARY

The interactive video broadcasting service may automatically create video highlights for the video broadcast streams, and provide the user with an option to select the video highlights so that the user can view highlights of the video broadcast streams (instead of selecting the full replay) to assist the user in determining whether he/she wants to view the full video broadcast stream or portions of the video broadcast stream. A user can watch a highlight reel of broadcasts in the user's home feed from the last day, few days, week, etc., highlights from any user profile (e.g., to get a flavor for their previous broadcasts), or highlights from any search (like #NoBillNoBreak or "pottery) to get a convenient overview of any topic.

For example, a viewing device executing an interactive streaming application may provide a selection of video highlights on its user interface. In some examples, the interactive streaming application may provide the video highlights selection on a home feed screen (or home screen (or page)) of the interactive streaming application. In some examples, the interactive streaming application may provide a list of video broadcast streams that are associated with a user account of a user of the interactive streaming application. These video broadcast streams may be previous broadcasts (e.g., broadcasts that have ended and are now stored for replay) from broadcasters who are linked to the user (e.g., broadcasters which the user are following). The user's home feed may also include promoted video broadcast streams. Upon selection of the video highlights, the interactive streaming application may initiate replay of the selected video segments from one or more video broadcast streams from the list of video broadcast streams.

In some examples, the list of video broadcast streams may include a first video broadcast stream associated with a first broadcaster, and a second video broadcast stream associated with a second broadcaster. The user may be following the first broadcaster and the second broadcaster, and consequently the user's home screen may identify the first and second video broadcast streams as recent video broadcast streams that may be of interest to the user. Upon selection of the video highlights, the highlights (e.g., the selected video segments from the first video broadcast stream) from the first video broadcast stream may be replayed. After the first video broadcast stream's highlights have been played, the interactive streaming application may provide a user-selectable option to replay the full first broadcast stream. Also, after the first video broadcast stream's highlights have been played, the interactive streaming application may receive an indication to continue to display the next highlights (e.g., the user may swipe to the left), causing the highlights from the second video broadcast stream (e.g., the selected video segments from the second video broadcast stream) to be played. In this manner, the user may quickly catch up on video broadcast streams without having to view or navigate within the full replays of the video broadcast streams. Also, by watching the highlights from the individual video broadcast streams, the user may determine whether he or she wants to watch the full replay.

In some examples, the selection of the video highlights may be provided in other locations of the interactive streaming application in addition to the home screen example described above. For example, the user of the interactive streaming application may search available live or stored broadcast streams among all the video broadcast streams associated with the interactive video broadcasting service. For instance, the user may enter keyword(s) into a search box (e.g., #NoBillNoBreak or "pottery"), and the interactive video broadcasting service may return a list of search results that identify one or more video broadcast streams that meet (or substantially meet) the search criteria. As part of the search results, the interactive streaming application may provide an opportunity to select video highlights of different video broadcast streams, and, when one of the highlights is selected, the application may initiate playback of the highlights from the video broadcast streams that are included in the search results (or one or more of the video broadcast streams included in the search results). In one example, the user may search for video broadcast streams relating to a certain topic like "pottery." The interactive streaming application may search and select the video broadcast streams meeting or substantially meeting the term "pottery." Then, the user may select the highlights button, which causes the interactive streaming application to play highlights of those video broadcast streams. In this manner, the user can quickly catch up on video broadcast streams relating to a certain topic or event.

In other examples, the interactive streaming application provides a geographical map of the available video broadcast streams, where the map correlates different video broadcast streams to different locations on the map. Also, the interactive streaming application may provide a map list that identifies the video broadcast streams from the current geographical map. In some examples, the interactive streaming application may provide a video highlights selection for the video broadcast streams from the map list, and, when highlights are selected, may initiate playback of the highlights from the video broadcast stream included on the map list (or one or more of the video broadcast streams included in the map list). In this manner, the user can view highlights of video broadcast streams from a certain geographical location (e.g., view highlights from the video broadcast stream originating from Brazil). In other examples, the video highlights selection may be provided on a user's profile page. A user may browse other users' profile pages, and may select the highlight button to play highlights of that user's previous broadcasts.

In some examples, instead of providing a selection of the highlights in the interactive streaming application, the interactive video broadcasting service may identify one or more highlight clips from one or more broadcast streams, and provide the highlight clip(s) to a partner (e.g., company, user, advertiser) of the interactive video broadcasting service. In some examples, the interactive video broadcasting service may provide a ranked list of highlight clips from a particular broadcast stream. In some examples, the list is ranked according to the amount of social media engagements associated with the broadcast stream or associated with the content of the broadcast stream. In some examples, the interactive video broadcasting service may provide indications of where the highlight(s) are located within a particular broadcast stream (instead of providing the actual video clips). For example, the interactive video broadcasting service may indicate a start time and end time for one or more highlights identified by the interactive video broadcasting service.

Highlights of a video broadcast stream can be generated intelligently, to provide a useful highlight to a user. Randomly selecting which video segments to include in the video highlights can yield highlights that are not representative of the content of the broadcast, mostly because social media broadcasts tend to be content—noisy, because they are unedited and show things that are not interesting to viewers. (For example, a broadcast of a live concert may include segments that preceded the concert, segments in which the broadcaster dropped her phone, or segments in which the broadcaster misdirected her phone camera to the ground). Hence, one must find the segment or segments of the video broadcast stream most relevant to the content attributed to the video broadcast stream. The system can achieve this by assessing the frequency of occurrence of a content classification over all accessible video broadcast streams and the frequency of occurrence of the content classification in a particular video broadcast stream. Content classifications that occur frequently over the accessible video broadcast streams of the platform are more likely to be noise and less likely to be of interest to viewers and hence are not selected for inclusion in the highlights. (These classifications are the figurative "AND"s and "THE"s of search terms, which terms occur in almost every searchable text document but provide little value for determining the content of a document.) For video broadcast streams, segments showing selfies, for example, tend to be noise as they occur very frequently, e.g., well over 55% of all accessible video broadcast streams. Content classifications that do not occur frequently, e.g., less than 1% of all accessible video broadcast streams, tend to be more likely to be of interest to viewers. These content classifications include, e.g., sports and food. By comparing the ratio of the frequency of an occurrence of a content classification in a particular video broadcast stream and the frequency of occurrence of the content classification over all accessible video broadcast streams (or a representative sample thereof), the system can select with high accuracy the segments of a video broadcast stream for inclusion within its video highlights so that the video highlights are representative of content shown in the broadcast.

In some examples, the system obtains a sample of all video broadcast streams available on the platform and classifies them according to classifications of content. The classifications can correlate to categories of available content classifiers that are supervised (machine learning models that are trained under some degree of human supervision or without human supervision). A video broadcast stream may include different content and hence may be classified under multiple classifications of content. For example, a video broadcast stream may include video segments of a sporting event and of food available at the sport venue and hence would likely be classified as having content related to sports and also as having content related to food. Moreover, the sample size should be sufficiently large to be representative of content shown in all accessible video broadcast streams at the time of sampling.

For the sample obtained, the system determines which content is popular among the broadcasts sampled and which content is rare. For a particular content classification, the determination can be based on the number of broadcasts sampled that show content classified under the particular classification. The system calculates the percentage of the sample video broadcast streams that show the particular content classification, and which percentage is a proxy measure of the frequency of occurrence of the particular classification over all accessible video broadcast streams. FIG. 2 shows an example of the content classifications and the respective percentages of their occurrence over the video broadcast streams sampled.

Based on the calculated popularity and rarity of classifications, the system formulates weighting metrics to either repress or promote each classification. For example, the system may identify which classifications are repressed and promoted, indicated as "hide" and "show," for example.

For a video broadcast stream, the system segments the video broadcast stream, e.g., into 3 second video segments, and programmatically classifies each video segment. A video broadcast stream can have, e.g., 4 of its segments classified as "Selfie," 8 as "Indoor," 125 as "Sport," and 150 as "Food." The system assigns a measure of confidence (e.g., confidence score) in its classification of each video segment.

For each segment of the video broadcast stream classified as "Show", the system may compute a ranking sore based on its confidence score. If the video segment has two or more classifications, the system computes the ranking score for that video segment based on all its confidence scores. Also, the system may apply weights to the confidential level of certain classifications (e.g., outdoor confidence scores may be weighted by 1.0, selfies confidence scores may be weighted by 0.5, and NSFW ("not safe for work") confidence scores may be weighted by −1.0). Then, the system selects one or more video segments for inclusion within the video highlights based on the calculated ranking scores (e.g., selects the top N video segments having the highest scores). Also, the system may sort the selected video segments by temporal order.

In some examples, the system may use engagement data associated with the video broadcast stream to provide further insight into which video segments to select for inclusion within the video highlights. For example, during the live broadcast, viewers may join the broadcast at different parts of the broadcast, comment on the broadcast at various times, and signal approval for specific moments in the broadcast, and may invite other social media users to join the broadcast. Such engagements are provided back to the viewers and the broadcaster. The system may store this engagement data in conjunction with the time (or time period) of when the engagements occurred within the timeline of the video broadcast stream. The system may use this engagement data to provide further insight into which portions of the video broadcast data were interesting to the viewers watching the live broadcast.

In one example, based on the engagement data, the system may recognize that a certain part of the video broadcast stream received a relatively high number of signals of approval, and adjust the ranking score for those video segments to higher ranking scores. Also, based on the engagement data, the system may adjust or improve the confidence scores or the weighting applied to the confidence scores of the video segments of the video broadcast stream. For example, the system may recognize a spike or high level of signals of appreciation for video segments having certain types of classifications, and may adjust the weighting given to that classification to a higher amount. Also, the text of the comments may provide insight into the content of the video segments. For instance, a viewer may provide a comment ("nice cat") at a particular moment in the broadcast, and this information may boost a confidence score that certain video segments should be classified as "animals."

In some examples, the system may use social media metrics (derived from an external social media platform different than the interactive video broadcasting service) for insight into which video segments to select for inclusion within the video highlights. Keywords (e.g., hashtags, identifiers, tags) may be defined to capture social media engagements about a video broadcast stream shared by the interactive video broadcasting service. For example, each video broadcast stream may be associated with general information such as the identity of the broadcaster, and a title or description about the broadcast, which may contain words or phrases that are used to obtain social media metrics from the external social media platform. In one example, the video broadcast stream may include a title "Lakers Game at Staples Center." The system may define a keyword for this video broadcast stream as "Lakers Game", and then obtain social media metrics from the external social media platform that relate to the term "Lakers Game" as well as other related terms that may also identify the underlying event. The system may map the social media metrics to the timeline of the video broadcast stream. For example, during the live broadcast, the system may receive social media metrics (e.g., 12K messages per minute for 12:55-1:00 pm) that are keyed on the keyword "Lakers Game", and then map this information to the relevant part of the timeline of the video broadcast stream. During the course of the video broadcast stream, there may be spikes of social media metrics, which may indicate that something interesting has occurred. These spikes of social media metrics may be used to provide further inside which video segments to select for inclusion within the video highlights. For example, the system may adjust the ranking score for video segments that correspond to the spikes in social media metrics.

BRIEF DESCRIPTION OF DRAWINGS

FIG. 2 shows an example of the content classifications and the respective percentages of their occurrence over the video broadcast streams sampled according to an implementation.

DETAILED DESCRIPTION

Techniques are disclosed herein for creating video highlights for video broadcast streams shared by an interactive video broadcasting service. Video segments of the video broadcast stream may be classified, e.g., assigned a classification and confidence score, using video classifiers. A ranking score may be computed for each classified video segment, and a number of N video segments having the highest score may be selected for inclusion within the video highlights. Also, the selection of video segments for the video highlights may be enhanced with engagement data (e.g., number of comments, signals of approvals, shares) given at specific moments in the broadcast, where video segments having a relatively high number of engagements are given a higher ranking. Further, the selection of video segments for the highlights may be enhanced with social media metrics derived from an external social media platform, where video segments having a relatively high number of social media metrics are given a higher ranking.

Figure 1:
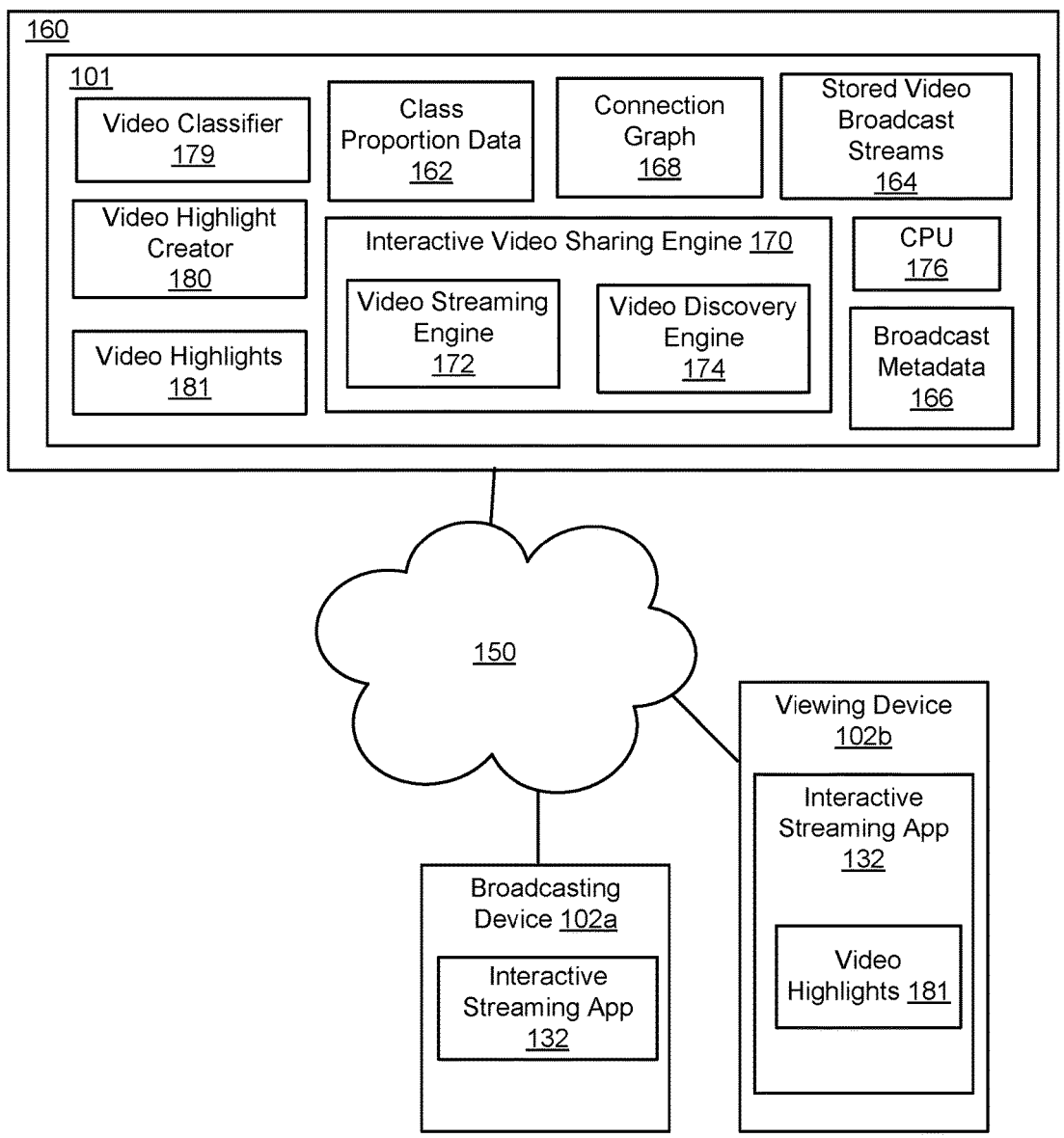
FIG. 1 is a schematic diagram of a system configured to support an interactive video broadcasting service executing on a server computer and an interactive streaming application configured to communicate with the interactive video broadcasting service over a network according to an implementation.

FIG. 1 is a schematic diagram of a system 100 configured to support an interactive video broadcasting service 101 executing on a server computer 160 according to an implementation. The server computer 160 may be a single computing device, or may be a representation of two or more distributed computing communicatively connected to share workload and resources. In some implementations, the server computer 160 is a social media platform server. The server computer 160 may also include one or more processors 176 formed in a substrate configured to execute instructions. The instructions may be stored in memory, such as RAM, flash, cache, disk, tape, etc. In addition, the server computer 160 may include one or more data stores configured to store data in a persisting manner.

The interactive video broadcasting service 101 may be configured to communicate with a plurality of devices over a network 150 in order to share video broadcasting streams. For example, the interactive video broadcasting service 101 may communicate with a plurality of broadcasting devices (one of which is illustrated as broadcasting device 102a) and a plurality of viewing devices (one of which is illustrated as viewing device 102b).

The broadcasting device 102a and the viewing device 102b may be any type of network-enabled computing device capable of supporting an interactive streaming application 132. In some examples, the broadcasting device 102a includes a camera configured to capture the video broadcasting stream (e.g., live stream video). In other examples, the broadcasting device 102a is associated with, or wirelessly connected to, an external camera. In some examples, the interactive streaming application 132 may be a mobile application, or a browser-based application. In some examples, the broadcasting device 102a and/or the viewing device 102b may be mobile computing devices (e.g., a smart phone, a PDA, a tablet, a wearable device, such as a wrist or head mounted device, a virtual reality device, a laptop computer, a drone equipped camera, etc.), or a non-mobile personal computing device (e.g., a desktop computing device, internet-enabled television or entertainment system).

The broadcasting device 102a may stream a live video broadcast stream to one or more viewing devices 104b via the interactive video broadcasting service 101. For example, the broadcasting device 102a may stream real-time video to the interactive video broadcasting service 101, and the interactive video broadcasting service 101 may provide the real-time video broadcasting stream to other social media users (e.g., one or more viewing devices 10b). In some examples, the interactive video broadcasting service 101 provides a shared broadcast generated by a user without specialized equipment or networks. The live video broadcast stream may include a closed feedback loop in which engagements from viewers (e.g., the viewing device(s) 102b) are provided to the broadcaster (e.g., the broadcasting device 102a) and/or to other viewing devices 102b in real time or near real time. For example, a viewer using the viewing device 102b may comment on the broadcast, may signal approval for specific moments in the broadcast (e.g., likes, taps, etc.), and may invite other social media users to join the broadcast while viewing the live video broadcast stream.

In some examples, such engagements are provided back to viewers and the broadcaster within a latency period (e.g., two seconds or less) suitable to allow the broadcaster to react to and interact with the viewers. For example, the interactive video broadcasting service 101 may provide representations of these activities to all participants in the broadcast. Thus, the broadcaster and anyone viewing the broadcast may see the comments posted and indications of approval from any viewer.

The interactive streaming application 132 may also be configured to attach a timestamp packet to the frames of the real-time video stream provided from the viewing device 102b and/or the broadcasting device 102a to the server computer 160. This special packet enables the server computer 160 to associate an engagement with a particular time in the live feed broadcast. For example, a viewer may be watching a live video broadcasting stream, and may tap the screen (indicating he/she likes a certain part of the broadcast), or the viewer may provide a comment at a particular moment in the broadcast. The interactive streaming application 132 may provide information about that engagement to the server computer 160. The information about the engagement may include an identifier for who provided the signal and when it was provided, for example by identifying the time in the timestamp packet associated with the frame being displayed when the engagement was received. The server computer 160 may receive the engagements and may provide information about the engagements to the viewers and the broadcaster. The engagements may include comments, signals of appreciation, share notifications, viewer join notifications, etc. This information may be used, at each device 102a, 102b, to generate representations of the engagement, as described below.

For example, a signal of appreciation may be represented by an icon. The icon may be a heart shape, a star shape, a smiley face shape, or some other shape. The interactive streaming application 132 may be configured to add an icon to the user display during the real-time video stream for each signal of appreciation. Each signal of appreciation may be received from one of the viewers of the real-time video broadcast stream. A viewer may send a plurality of signals of appreciation during the real-time video stream, so that a viewer is not limited to signaling appreciation for the video broadcast stream once. Instead, the signals of appreciation may be associated with a particular moment of time in the real-time video broadcast stream and a viewer can send as many signals as desired. In some examples, the icon representing a signal of appreciation may have a different appearance for each viewer. Then, the broadcaster may decide to continue the broadcast when the broadcast is popular as suggested by the number of viewers, by a high level of engagements, viewer comments, and other feedback, and/or by the identity of one of more viewers.

When a broadcast ends, the interactive video broadcasting service 101 may store the broadcast in stored video broadcast streams 164. The video broadcast stream can be stored for only a period of time, e.g., 2 hours, 24 hours, one week, one month, etc., or may be stored indefinitely. A viewer using the viewing device 102b may replay the saved broadcast and may see the comments, approvals, and notification messages in the same place that live viewers also saw these elements. In some implementations, the replay viewer may add additional appreciation signals using the viewing device 102b.

In some examples, the interactive video broadcasting service 101 may include a video classifier 179 configured to classify small video segments into one or classifications. Each video segment may have a predefined length (e.g., 2 or 3 seconds).

The video classifier 179 may include a machine learning algorithm trained to classify a small portion (also referred to as video segment) of the video broadcast stream, e.g., a few seconds, into one or more classifications. A classification may be a characteristic of the content of the video segment. Examples of possible classifications include, but are not limited to, selfie, noise, computer screen, driving, talk, stage, sports, food, outdoors, animals, humans, texture, graphics, interior, nature, construction, interior, unplugged, art, NSFW, etc. In some examples, classifications may include sub-classes such as Sports.Skiing, Sports.Baseball, Sports.Golf, etc. In some examples, the classifications may be hierarchical. In some examples, the classifications may be domain specific. The classifications can be manually curated but may be refined with the help of the system 100.

The classifier 179 may be a LSTM ("Long Short-term memory") classifier that has undergone supervised training. In some examples, the classifier 179 may be one classifier able to classify a video segment of the video broadcast stream into one or several classifications. In other examples, the classifier 179 may represent a group of classifiers, each classifier trained to classify a video segment of the video broadcast stream as either in or not in a specific classification. In either case, the classifier 179 may provide a confidence score for each class for a video segment of the video broadcast stream, the confidence score representing how confident the model is that the video segment is correctly classified as in or not in the classification. The classifications and confidence scores may be stored for each video segment of the video broadcast stream, e.g., as part of broadcast metadata 166. In some implementations, the classifications and confidence scores may be deleted or disregarded after a determined amount of time so that portions of the video broadcast stream that are too old are no longer stored.

The interactive video broadcasting service 101 may include a video highlight creator 180 configured to automatically create video highlights 181 for one or more of the stored video broadcast streams 164, and provide the user with an option on the viewing device 102*b* to select the video highlights 181 so that the user can view the highlights of one or more of the stored video broadcast streams 164 (instead of selecting the full replay) to assist the user in determining whether he/she wants to view the full broadcast or portions of the broadcast. The video highlights 181 may include one or more video segments that generally represent the highlights of a video broadcast stream. Also, the video highlights 181 may include video segments from two or more video broadcast streams.

The video highlight creator 180 may create video highlights 181 for a video broadcast stream based on the output of the video classifier 179 and class proportion data 162. For example, the video highlight creator 180 may use classification data (e.g., the classifications and confidence scores) from the video classifier 179 in view of the class proportion data 162 to determine which part of the video broadcast stream is interesting or uncommon. The class proportion data 162 may be generated manually, automatically, or a combination of automatic and manual curation. In some examples, the class proportion data 162 may identify classifications manually tagged as interesting. Any classifications tagged as interesting may be highlight eligible (e.g., show), or in other words eligible to be included as part of the video highlights 181. Classifications not manually tagged are not eligible (e.g., hide). In some examples, the system may make a determination about whether a classification is interesting or not based on a proportion associated with the classification. The proportion represents how often video broadcast streams with a particular classification appear in a representative sample of video broadcast streams. For example, the system may select 1000 video broadcast streams as a sample and determine what percentage of the video broadcast streams are classified in a particular classification. A lower percentage represents interesting or uncommon classes. Classifications with a percentage that falls below a threshold may be considered interesting. FIG. 2 shows an example of the content classifications and the respective percentages of their occurrence over the video broadcast streams sampled according to an implementation. In some examples, some classifications, even if interesting, may not be eligible to be included within the video highlights 181, for example to prevent certain subject matter (e.g., pornographic content) from being presented in the video highlights 181.

The video highlight creator 180 may compute a ranking score for each classified video segment of video broadcast stream based on its confidence score. If the video segment has two or more classifications, the video highlight creator 180 computes the ranking score for that video segment based on all its confidence scores. Also, the video highlight creator 180 may apply weights to the confidential level of certain classifications (e.g., outdoor confidence scores may be weighted by 1.0, selfies confidence scores may be weighted by 0.5, and NSFW confidence scores may be weighted by −1.0). The video highlight creator 180 may select one or more video segments for inclusion within the video highlights 181 based on the calculated ranking scores (e.g., selects the top N video segments having the highest scores). Also, the video highlight creator 180 may sort the selected video segments by temporal order.

In some examples, the video highlight creator 180 may use engagement data associated with the video broadcast stream to provide further insight into which video segments to select for inclusion within the video highlights 181. For example, during the live broadcast, viewers may join the broadcast at different parts of the broadcast, comment on the broadcast at various times, and signal approval for specific moments in the broadcast, and may invite other social media users to join the broadcast. The system 100 may store this engagement data within the broadcast metadata 166. For instance, the system 100 may store this engagement data in conjunction with the time (or time period) of when the engagements occurred within the timeline of the video broadcast stream. The video highlight creator 180 uses this engagement data to provide further insight into which portions of the video broadcast data were interesting to the viewers watching the live broadcast.

In one example, based on the engagement data, the video highlight creator 180 can identify that a certain part of the video broadcast stream received a relatively high number of signals of approval and can adjust the ranking score for those video segments to higher ranking scores. Also, based on the engagement data, the video highlight creator 180 may adjust or improve the confidence scores or the weighting applied to the confidence scores of the video segments of the video broadcast stream. For example, the video highlight creator 180 may recognize a spike or high level of signals of appreciation for video segments having certain types of classifications, and may adjust the weighting given to that classification to a higher amount. Also, the text of the comments may provide insight into the content of the video segments. For instance, a viewer may provide a comment ("nice cat") at a particular moment in the broadcast, and this information may boost a confidence score that certain video segments should be classified as "animals."

In some examples, the video highlight creator 180 may create video highlights 181 for one or more video broadcasting streams shared by the interactive video broadcasting service 101 based on social media engagements obtained from a social media platform different than the social media platform of the interactive video broadcasting service 101. The video highlight creator 180 may use social media metrics (derived from an external social media platform different than the interactive video broadcasting service) for insight into which video segments to select for inclusion within the video highlights. The video highlight creator 180 may define keywords (e.g., hashtags, identifiers, tags) from information about the video broadcast stream (e.g., identity of the broadcaster, title, description, etc.) to capture social media engagements about the video broadcast stream on the external social media platform, and map the volume of engagements to the timeline of the video broadcast stream. For example, social media metrics from the external social media platform may be defined by a domain (e.g., #Lakers). If the domain is too large (e.g., the keyword is too broad or not specific enough), the social media metrics may not actually reflect the underlying event. However, if the domain is properly defined, the system may obtain the appropriate social media metrics that actually reflect the interest of engagement of the underlying event. The system may define one or more domains (or a domain with one or more sub-domains, e.g., animals.cat.) for a particular video broadcast stream shared by the interactive video broadcasting service 101.

The amount of engagements exchanged on the external social media platform may be determined based on that domain (e.g., 9K messages having the keyword #Lakers). For example, a broadcaster may be broadcasting a Lakers game to a plurality of viewing devices using the interactive video broadcasting service. The system may define the domain for the external social media platform as #Lakers (e.g., pulls information from the metadata of the video broadcast stream), and the system may receive the social media metrics from the external social media platform having that keyword. As such, over the course of the Lakers broadcast, there may be certain period having high levels of messages exchanged on the external social media platform involving the keyword "Lakers." These "spikes" may be used as an indicator on which portion of the video broadcast stream is more interesting to the viewers (e.g., which portions could be highlights). The system may map the volume of social media engagements (e.g., messages exchanged on the external social media platform) to a timeline of the video broadcast stream. The system can determine which video segments of the video broadcast stream have spikes in social media engagements, which can provide inside into which portions of the broadcast to be used for the highlights. In some examples, the video highlight creator 180 may adjust the ranking score for the video segments that correspond to the spike in social media metrics.

In some examples, the video highlight creator 180 is configured to apply one or more post-processing on the video clips selected for inclusion within the video highlight. In some examples, the video highlight creator 180 is configured to modify all or a portion of the video used for the video highlight. For example, the video highlight creator 180 may apply slow motion effects, filters, contrasts, and/or image scaling to a particular video segment or segments in the video highlight.

The viewing device 102b executing the interactive streaming application 132 may provide a selection of the video highlights 181 on its user interface. In some examples, the interactive streaming application 132 may provide the video highlights selection on a home screen (or page) of the interactive streaming application 132. In some examples, the interactive streaming application 132 may provide a list of video broadcast streams, which are associated with a user account of a user of the interactive streaming application 132. These video broadcast streams may be previous broadcasts (e.g., broadcasts that have ended and are now stored for replay) from broadcasters which are linked to the user (e.g., broadcasters which the user is following). Upon selection of the video highlights 181, the interactive streaming application 132 may initiate replay of the selected video segments from the list of video broadcast streams.

In some examples, the list of video broadcast streams may include a first video broadcast stream associated with a first broadcaster, and a second video broadcast stream associated with a second broadcaster. The user may be following the first broadcaster and the second broadcaster, and consequently the user's home screen may identify the first and second video broadcast streams as recent video broadcast stream that may be of interest to the user. Upon selection of the video highlights 181, the highlights (e.g., selected video segments from the first video broadcast stream) may be replayed. After the first video broadcast stream's highlights have been played, the interactive streaming application 132 may provide a user-selectable option to replay the full first broadcast stream. Also, after the first video broadcast stream's highlights have been played, the interactive streaming application 132 may receive an indication to continue to display the next highlights (e.g., the user may swipe to the left), causing the highlights from the second video broadcast stream (e.g., the selected video segments from the second video broadcast stream) to be played. In this manner, the user may quickly catch up on broadcast streams without having to view or navigate within the full replays of the video broadcast streams. Also, by watching the highlights from the individual video broadcast streams, the user may determine that he or she wants to watch the full replay.

In some examples, the selection of the video highlights 181 may be provided in other locations of the interactive streaming application 132 in addition to the home screen example described above. For example, the user of the interactive streaming application 132 may search available live or stored video broadcast streams among all the video broadcast streams associated with the interactive video broadcasting service 101. For instance, the user may enter keyword(s) into a search box, and the interactive video broadcasting service 101 may return a list of search results that identify one or more video broadcast streams that meet (or substantially meet) the search criteria. As part of the search results, the interactive streaming application 132 may provide an opportunity to select video highlights of different video broadcast streams, and, when one of the highlights is selected, the interactive streaming application 132 may initiate playback of the video broadcast streams that are included in the search results. In other examples, the interactive streaming application 132 provides a geographical map of the available video broadcast streams, where the map correlates different video broadcast streams to different locations on the map. Also, the interactive streaming application 132 may provide a map list that identifies the video broadcast streams from the current geographical map. In some examples, the interactive streaming application 132 may provide a video highlights selection for the video broadcast streams from the map list, and, when highlights are selected, may initiate playback of highlights from the video broadcast stream included on the map list. In other examples, the video highlights selection may be provided on a user's profile page.

The interactive video broadcasting service 101 may include an interactive video sharing engine 170. The interactive video sharing engine 170 may service a social media platform, and thus, have access to a connection graph 168 for the social media platform. The connection graph 168 may be a data structure representing relationships (i.e., connections) between one or more entities. For example, the connection graph 168 may be a data set that tracks relationships between social media accounts. Relationships can include friending, following, liking, linking, or some other relationship. In some implementations the connection graph 168 may represent entities that have installed an interactive streaming application 132 and set up a user account through the interactive streaming application 132.

In some implementations, the interactive video sharing engine 170 may aggregate the different types of engagements, generating statistics for the broadcast. For example, the interactive video sharing engine 170 may track the number of signals of appreciation received from all viewers per minute, track the total number of signals of appreciation, track the comments per minute, track the total number of comments, track the total number of viewers, track the average viewing time of the viewers, track the number of shares, etc. The statistics may be stored in the broadcast metadata 166. The broadcast metadata 166 may be used to feature popular broadcasts (e.g., measured by number of viewers, average of signals of appreciation per second correspondence with social media messages or other broadcasts, etc.) for replay, to suggest popular broadcasters (e.g., based on total number of signals of appreciation received over all broadcasts or based on a high average number of signals of appreciation per second across all the broadcasts for the broadcaster, etc.), to notify potential audience members about a popular live broadcast. In addition, the video highlight creator 180 may use the broadcast metadata 166 to create the video highlights 181 for one or more video broadcast streams.

The interactive video sharing engine 170 may include a video streaming engine 172. In some implementations, the targeted viewer may only view the real-time video stream if the viewing device 102b used by the targeted viewer has the interactive streaming application 132 installed. Once a targeted viewer chooses to join the real-time video broadcast stream, the video streaming engine 172 may provide the encoded real-time video broadcast stream to the viewing device 102b. The video streaming engine 172 may be configured to provide the video broadcast stream, including any added engagement indications, to the viewing devices 102b in a format appropriate for a particular viewing device 102b. For instance, the video streaming engine 172 may be configured to receive the video broadcast stream from the broadcasting device 102a and to provide it in a variety of different formats or playback on the viewing devices 102b. Thus, the video streaming engine 172 may convert the live video broadcast stream from the broadcasting device 102a into a plurality of formats and, when the viewing device 102b joins the real-time video broadcast stream, the video streaming engine 172 may select, based on information about the viewing device 102b, an appropriate format for the viewing device 102b.

The video streaming engine 172 may use the connection graph 168 to determine user accounts directly related to the user account for the broadcaster of the broadcasting device 102a. These directly related user accounts may receive a message, for example a push notification, regarding the video broadcast stream. In some implementations, only user accounts that have a "following" relationship with the account corresponding to the broadcaster may receive the message. When the broadcast information indicates the broadcast is private, the information may include identifiers (e.g. user account identifiers) for user accounts that can receive the message (e.g., push notification) about the live video broadcast stream. Thus, in some implementations, a private broadcast may be for a subset of the user accounts directly related to the broadcaster account in the connection graph 168 (e.g., followers, friends, circles, or other forms of associations), whereas a public broadcast can be joined by anyone, but only accounts directly related to the broadcaster are notified of the live video broadcast stream.

The interactive video broadcasting service 101 may include a video discovery engine 174. The video discovery engine 174 may enable the interactive video sharing engine 170 to suggest real-time video broadcast streams and/or stored video broadcast streams, e.g., in stored video broadcast streams 164, to the viewing device 102b. In some implementations, the video discovery engine 174 may use the broadcast metadata 166 to provide or suggest real-time video broadcast streams to a user. For example, the video discovery engine 174 may suggest a real-time video broadcast stream that has received many signals of appreciation in a short duration, a real-time video broadcast stream that has a quantity of viewers that exceeds a threshold, a real-time video broadcast stream that has an average number of engagements per second that exceeds a threshold, etc. The video discovery engine 174 may boost the position of a real-time video broadcast stream in the search result based on attributes of the user.

The video discovery engine 174 may also use location data to suggest real-time video broadcast streams for viewing. For example, the video discovery engine 174 may identify several real-time video broadcast streams that are in close proximity to each other. Such real-time video broadcast streams may be an indication of an important event occurring at the location. The video discovery engine 174 may suggest one or more of these real-time video broadcast streams (e.g., selected at random, based on past popularity of the broadcaster, based on number of viewers of the stream, etc.) as a suggested real-time video broadcast stream.

In some examples, the video discovery engine 174 may initiate a user interface that shows the location of the real-time video broadcast streams and may enable a user to select one of the real-time video broadcast streams for preview of viewing. For example, the user may navigate in a map that includes an icon representing the location of live video broadcast streams and the user may select an icon to join or preview the live video broadcast stream associated with the location. In some examples, the video discovery engine 174 may receive a query from a user and search titles of live video broadcast streams and/or comments provided in live video broadcast streams and provide video broadcast streams with responsive titles or comments in a search result to the viewer. The video discovery engine 174 may also search titles and comments for stored video broadcast streams and may provide one or more stored video broadcast streams in the search result.

Figure 3:
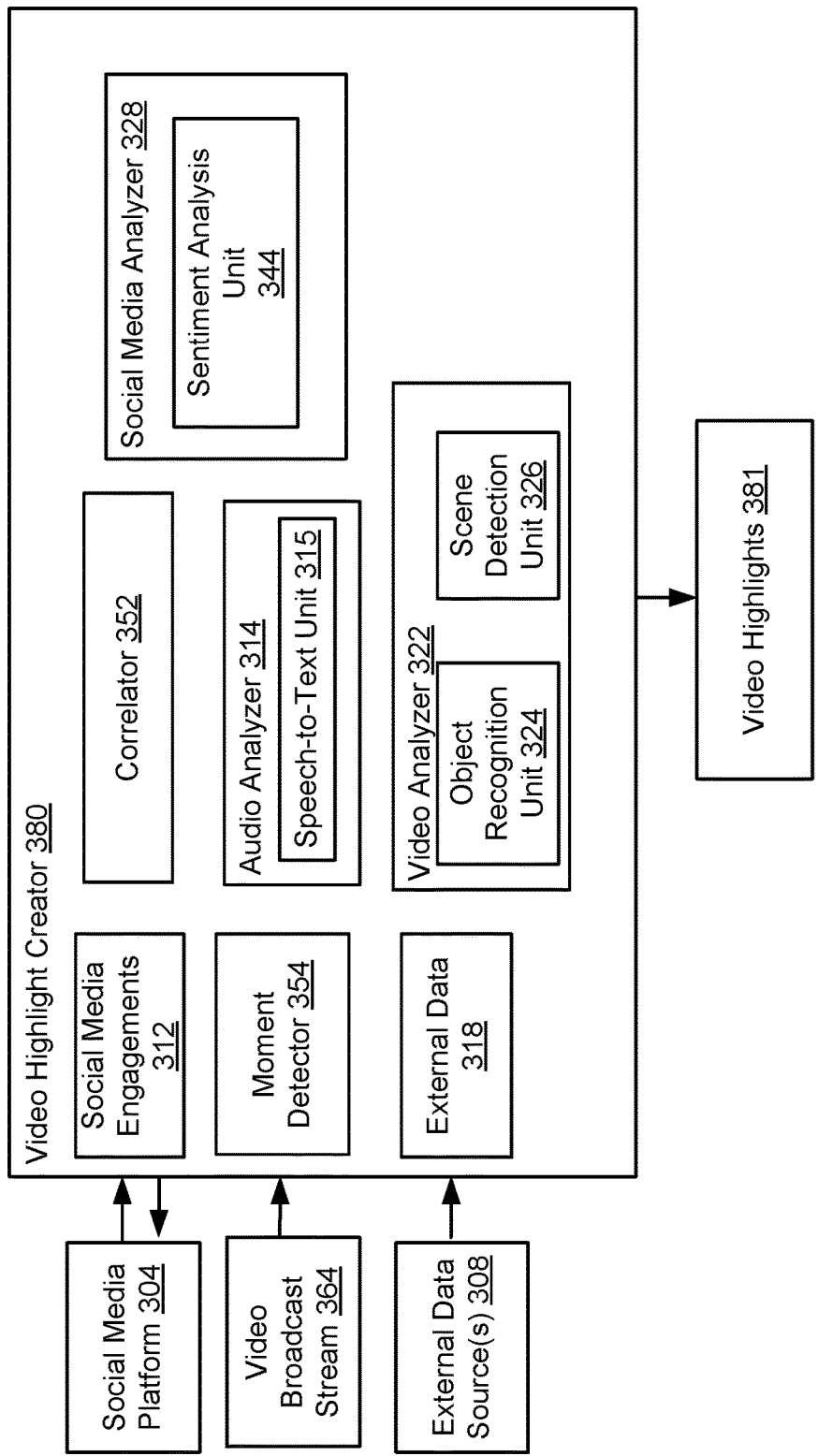
FIG. 3 is a schematic diagram of a video highlight creator configured to create video highlights for video broadcast streams shared by the interactive video broadcasting service of FIG. 1 according to another implementation.

FIG. 3 is a schematic diagram of a video highlight creator 480 configured to create the video highlights 381 for one or more video broadcast streams 364 shared by the interactive video broadcasting service 101 of FIG. 1 according to another implementation. In some examples, the video highlight creator 380 may create the video highlights 181 based on social media engagements 312, as explained below.

The video highlight creator 380 may obtain a video broadcast stream 364, and may receive one or more social media metrics indicating a volume of social media engagements 312 associated with the video broadcast stream 364 from a social media platform 304. The social media platform 304 may be any type of computer-mediated system that allows people to create, share, or exchange information, ideas, pictures/videos in virtual communities or networks. In some examples, the social media platform 304 may be a different social media platform than the one associated with the interactive video broadcasting service 101 of FIG. 1. The social media engagements 312 may be information exchanged on the social media platform that relates to the video broadcast stream 364 such as messages, posts, comments, signals of appreciation about the video broadcast stream 364. The social media metrics or volume of social media engagements 312 may include the number of social media engagements per a certain unit of time. In some examples, the volume of social media engagements may be the number of messages per minute that relate to the video broadcast stream 364 (e.g., includes one or more keywords that have been identified as being indicative of the video broadcast stream 364).

The video highlight creator 380 may include a correlator 452 configured to correlate the volume of social media engagements 312 with a timeline of the video broadcast stream 364. For example, the correlator 352 may identify related social media engagements 312 from the social media platform 304 using certain keywords, identifiers, tags, hashtags, or other mechanisms that can identify information exchanged on the social media platform 304 (generally referred to as keywords). For instance, the use of keywords permits the video highlight creator 380 to obtain a sense of the level of engagement with the video broadcast stream 364 (e.g., are there many people interested in this broadcast? Which parts are the most interesting to the viewers?).

The correlator 352 may map the various levels of social media engagement (e.g., one part of the video broadcast stream 364 may have a higher social media engagement, another part of the video broadcast stream 364 may have a lower social media engagement) with the timeline of the video broadcast stream 364. The timeline of the video broadcast stream 364 may be a time interval from a starting time to an ending time. The timeline of the video broadcast stream 364 may be in minutes, seconds, or fraction of seconds. Also, each social media engagement 312 may be associated with a certain time in the timeline. For example, if the social media engagement 312 is a message posted on the social media platform 304, the time may be the timestamp of when the message was posted. In some examples, the correlator 352 may be able to obtain the total number of messages per minute that is associated with the video broadcast stream 364. Accordingly, as the correlator 352 obtains the newly received social media volume (e.g., 12K messages per minute for 12:55-1:00 pm), the correlator 352 maps this information to the relevant part of the timeline of the video broadcast stream 364.

The correlator 352 can correlate other types of data such as external data 318 from one or more external data sources 308, output from a video analyzer 322 that analyzes the video component of the video broadcast stream 364, output from an audio analyzer 314 that analyzes the audio component of the video broadcast stream 364, output from a social media analyzer 328 that analyzes the social media engagements 312 about the video broadcast stream 364 to the timeline of the video broadcast stream 364 in order to understand the importance, relevance, significance, and/or content of different video segments of the video broadcast stream 364 on multiple levels, which then can be used to automatically create the video highlights 381.

The video highlight creator 380 may include a moment detector 354 configured to determine a moment of relative importance using the volume of social media engagements 312. For example, if the volume of the social media engagements 312 is above or equal to a threshold amount (spike), the moment detector 354 may detect that a certain moment of importance has occurred. In some examples, if the rate of social media engagements 312 has increased quickly (increased by a certain percentage or amount), the moment detector 354 may be configured to determine that a certain moment of importance has occurred. There may be a spike in the social media engagements 312 for a particular time (or time interval). This spike may be caused by an important event occurring in the video broadcast stream 364, and the moment detector 354 may be able to determine which part of the video broadcast stream 364 corresponds to the spike based on the mapping or correlation of the volume of social media engagements with the timeline of the video broadcast stream 364.

The external data 318 may be any type of information that can provide indications as to the importance of events, the timing events, and/or information about the event itself. In some examples, the external data 318 may be score (or scoreboard information) about broadcasted sporting events. This scoring data may indicate that a particular relevant event has occurred (e.g., a touchdown has been scored), and the time associated with this touchdown. The moment detector 354 may use this external data 318 to determine points in the timeline of the video broadcast stream 364 that are relevant/interesting.

The video analyzer 322 may be configured to analyze the video component of the video broadcast stream 364 to obtain information helpful for automatically creating the video highlights 181. For example, the video analyzer 322 may analyze the video component of the video broadcast stream 364 to obtain information that can assist with identifying the video broadcast stream 364, the nature of the video broadcast stream 364, the underlying events or objects (including persons) captured by the video broadcast stream 364, and/or the starting and ending points for the video highlights 381.

The video analyzer 322 may include an object recognition unit 324 configured to perform object recognition to recognize people and/or objects in the video broadcast stream 364. The object recognition unit 324 may use any type of facial recognition techniques such as identifying facial features by extracting landmarks or features from an image of the subject's face. The object recognition unit 324 may include two-dimensional or three-dimensional facial recognition. Also, the object recognition unit 324 may use any type of object recognition techniques to identify objects in the frames of the video such as edge matching, divide-and-conquer search, greyscale matching, gradient matching, and/or histograms, etc. The object recognition unit 324 may employ these techniques to identify certain objects such as buildings or other landmarks. As such, the object recognition unit 324 may detect the number of people in the video broadcast stream 364, and/or detect people in the video broadcast stream 364. The video highlight creator 380 may use the output of the object recognition unit 324 to identify certain people (e.g., famous people), a large number of people (e.g., signifying a relevant event), the timing of when objects occur (e.g., the basketball starts moving on the court), and other types of information derived from a video analysis in order to detect certain relevant moments and/or the start and end of the video highlights 381.

The video analyzer 322 may include a scene detection unit 326 configured to detect a change in the scenes of the video component of the video broadcast stream 364, e.g., when certain scenes of the video broadcast stream 364 begin or end. The scene detection unit 326 may determine whether the action has moved to another location, when the broadcaster has changed cameras (e.g., moved from a close-up camera to a further-away camera, or vice versa), and/or the subject matter of the broadcast has changed (e.g., break to commercials, or returned to programming from commercials). The output from the scene detection unit 326 may be utilized by the video highlight creator 380 to assist with determining the start and end of a video segment of the video highlights 381 (e.g., so that it does not extend into a commercial, includes content from a previous scene, includes content that appears out of place).

The audio analyzer 314 may be configured to analyze the audio component of the video broadcast stream 364 to obtain information helpful for automatically creating the video segments of the video highlights 381. For example, the audio analyzer 314 may analyze the audio component of the video broadcast stream 364 to obtain information that can assist with identifying the video broadcast stream 364, the nature of the video broadcast stream 364, the underlying events or objects (including persons) captured by the video broadcast stream 364, and/or the starting and ending points for one or more video segments of the video highlights 381. The audio analyzer 314 may be configured to obtain closed captioned data associated with the video broadcast stream 364. The audio analyzer 314 may be configured to analyze the closed captioned data for keywords. In some examples, the audio analyzer 314 may include a speech-to-text unit 315 configured to perform speech recognition on the audio component of the video broadcast stream 364, and analyze the text of the audio component for keywords. The audio analyzer 314 may use any known types of natural language processing to detect keywords from the speech of the audio. The audio analyzer 314 may determine which point in the audio or video component the one or more keywords were spoken so that the video highlight creator 380 may have a more accurate point regarding the detection of that relevant moment and/or the start and end of a video segment of the video highlights 381.

The social media analyzer 328 may be configured to analyze the social media engagements 312 to obtain information that may be helpful for creating and sharing the video highlights 181. For example, the social media analyzer 328 may determine whether a particular portion of the video broadcast stream 364 is viewed favorably or un-favorably to the users of the social media platform 304 as a whole or to particular groups of users from a sentiment analysis unit 344. In some examples, the social media analyzer 328 may determine whether a particular portion of the video broadcast stream 364 can be attributed to one or more topics and which users are interested in those topics, and/or whether a particular portion of the video broadcast stream 364 can be attributed to one or more topics or fields and which users are experts in those topics or fields. In some examples, some or all of the parts of the social media analyzer 328 are included within the infrastructure of the social media platform 304 and the video highlight creator 380 interfaces with the social media platform 304 to obtain any social media metrics regarding user engagement, as any of the social media analysis described herein.

The video highlight creator 380 may use the output of the social media analyzer 328 to determine whether or not to select a video segment for inclusion within the video highlights 181. For example, if the video highlight creator 380 determines that the sentiment associated with the social media engagements 312 is negative (or beyond a certain threshold), the video highlight creator 380 may decide not to include that video segments within the video highlights 381. On the other hand, if the video highlight creator 380 determines that the sentiment associated with the segment's social media engagements 312 is relatively positive, the video highlight creator 380 may decide to include those video segments in the video highlights 381.

Figure 4:
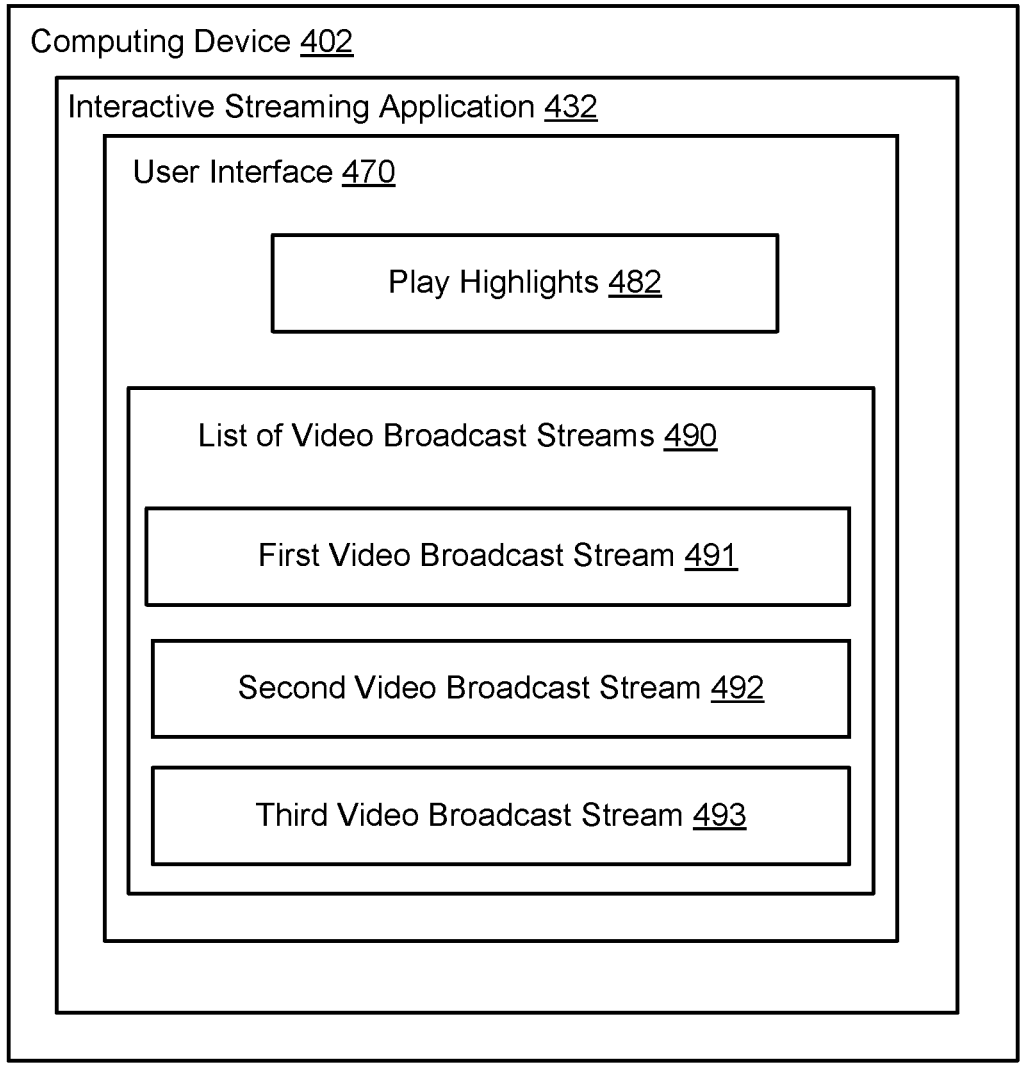
FIG. 4 is a schematic diagram of a computing device having an interactive streaming application according to an implementation.

FIG. 4 is a schematic diagram of a computing device 402 having an interactive streaming application 432 according to an implementation. The computing device 402 may be an example of the viewing device 102b of FIG. 1.

The computing device 402 executing the interactive streaming application 432 may provide a selection of play highlights 482 on a user interface 470 of the interactive streaming application 432. In some examples, the interactive streaming application 432 may provide the selection of play highlights 482 on a home screen (or page) of the interactive streaming application 432. In some examples, the interactive streaming application 432 may provide a list of video broadcast streams 490, which are associated with a user account of a user of the interactive streaming application 432. These video broadcast streams may be previous broadcasts (e.g., broadcasts that have ended and are now stored for replay) from broadcasters which are linked to the user (e.g., broadcasters which the user is following). Upon selection of play highlights 482, the interactive streaming application 432 may initiate replay of the selected video segments of the video highlights 181.

In some examples, the list of video broadcast streams 490 may include a first video broadcast stream 491 associated with a first broadcaster, and a second video broadcast stream 492 associated with a second broadcaster, and a third video broadcast stream 493 associated with a third broadcaster. However, the list of video broadcast streams 490 may include any number of video broadcast streams corresponding to one, two, or more broadcasters. The user account of the user of the computing device 402 may be following the first broadcaster, the second broadcaster, and the third broadcaster such that that user's home screen identifies these broadcasts in the list of video broadcast streams 490. Upon selection of play highlights 482, the highlights from the first video broadcast stream 491 may be replayed (e.g., the selected video segments from the first video broadcast stream 491). At the end of the first video broadcast stream's highlights, the interactive streaming application 432 may provide a user-selectable option to replay the full first broadcast stream 491. Also, at the end of the first video broadcast stream's highlights, the interactive streaming application 432 may receive an indication to continue to display the next highlights (e.g., the user may swipe to the left), which plays the highlights from the second video broadcast stream 492 (e.g., the selected video segments from the second video broadcast stream 483). This process may continue until the highlights from each video broadcast stream from the list are displayed. In this manner, the user may quickly catch up on the video broadcast streams without having to view or navigate within the full replay. Also, by watching the highlights from the individual video broadcast streams, the user may determine that he or she wants to watch the full replay.

Also, as indicated above, the selection of the play highlights 482 may be provided in other locations of the interactive streaming application 432 in addition to the home screen example described above. For example, the user of the interactive streaming application 432 may search available live or stored video broadcast streams among all the video broadcast streams associated with the interactive video broadcasting service 101. For instance, the user may enter keyword(s) into a search box, and the interactive video broadcasting service 101 may return a list of search results that identify one or more video broadcast streams that meet (or substantially meet) the search criteria. As part of the search results, the interactive streaming application 432 may provide the selection of play highlights 482, and, when selected, initiates playback of the highlights from video broadcast streams that are included in the search results. In other examples, the interactive streaming application 432 provides a geographical map of the available video broadcast streams, which maps video broadcast streams to locations. Also, the interactive streaming application 432 may provide a map list that identifies the video broadcast streams from the current geographical map. In some examples, the interactive streaming application 432 may provide the selection of the play highlights 482 for the video broadcast streams from the map list, and, when selected, initiates playback of the highlights from the video broadcast stream included on the map list. In other examples, the video highlights selection may be provided on a user's profile page.

Figure 5A:
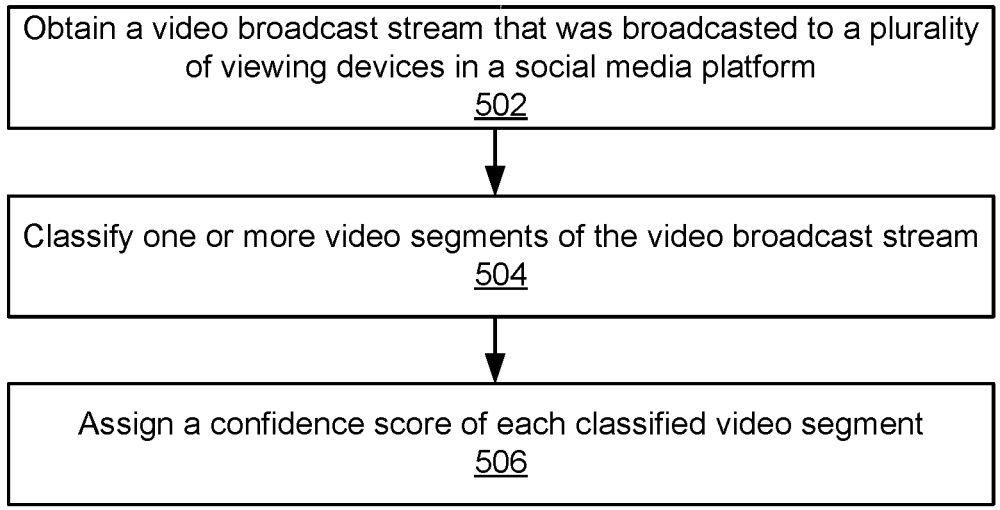
FIG. 5A is a flow chart of an example method depicting example operations of a classifier within the interactive video broadcasting service of FIG. 1 according to an implementation.

FIG. 5A is a flow chart illustrating a method depicting example operations of a classifier within the interactive video broadcasting service 101 according to an implementation.

A video broadcast stream that was broadcasted to a plurality of viewing devices in a social media platform may be obtained (502). For example, the system may obtain a video broadcast stream that was shared using the interactive video broadcasting service. In some examples, the live broadcast of the video broadcast stream has ended, and this video broadcast stream is stored in the stored video broadcast streams and available for replay.

One or more video segments of the video broadcast stream may be classified (504), and a confidence score of each classified video segment may be assigned (506). For example, the system may classify one or more video segments of the video broadcast stream into one or more classifications. For example, system classifies video segments according to classifications using trained classifiers. The classifiers may be supervised models, e.g., machine learning models that are trained under some degree of supervision. Any particular video broadcast stream may include different content in different segments and hence may be classified under multiple classifications. The system assigns a confidence score in its classification of each video segment. The confidence score may indicate a likeliness of a respective video segment having its determined or assigned classification. For example, some video segments in the video broadcast stream may be assigned a classification of "outdoor" with a probability of 0.99, 0.9, or 0.88, which indicates that these video segments have a high probability that its contents depicts outdoor scenes.

Figure 5B:
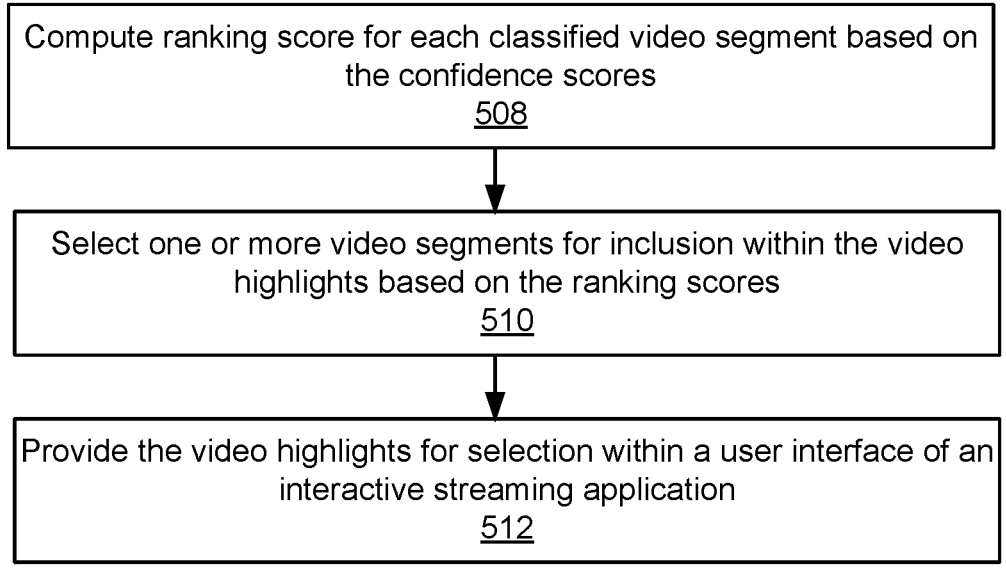
FIG. 5B is a flow chart of an example method depicting example operations of a highlight creator within the interactive video broadcasting service of FIG. 1 according to an implementation.

FIG. 5B is a flow chart illustrating a method depicting example operations of a video highlight creator within the interactive video broadcasting service 101 according to an implementation.

A ranking score may be computed for each classified video segment based on the confidence score(s) (508). For example, for each classified video segment, the system may calculate a ranking score based on its confidence score(s). In some examples, the system may weight certain classifications. Also, in some examples, the system may adjust the ranking score and/or the weight based on engagement data associated with the video broadcast stream (e.g., volumes of approvals (e.g., hearts), joins, shares, comments, which are associated with specific times in the broadcast). For example, a relatively high number of engagements may indicate to decrease the ranking score and/or the weight. Also, in some examples, the system may adjust the ranking score and/or weight based on social media engagements about the broadcast, which were collected from an external social medial platform.

One or more video segments may be selected for inclusion within the video highlights based on the ranking scores (510). For example, the system may select one or more of the video segments for inclusion within the video highlights based on the calculated ranking scores. In some examples, the system may select the top N video segments having the highest ranking scores, where N may be any integer greater or equal to two. In other examples, the system may select one or more video segments with ranking scores above or equal to a threshold level. In some examples, the system may sort the selected video segments by time and assemble the selected video segments to create the video highlights.

Video highlights may be provided for selection within a user interface of an interactive streaming application (512). For example, the system may provide the video highlights for selection within a user interface of the interactive streaming application, as shown with respect to FIGS. 6A-6E.

Figure 6A:
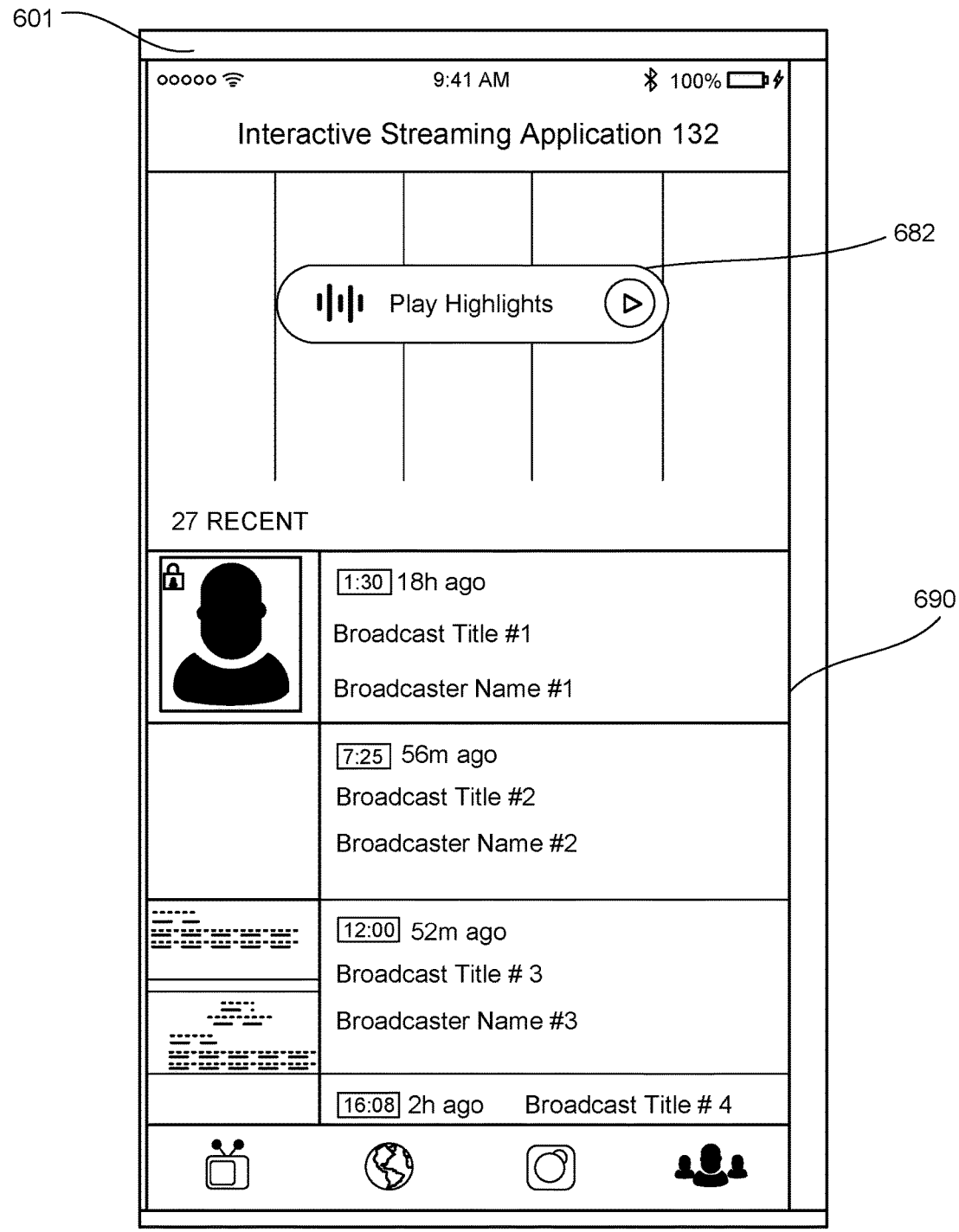
FIG. 6A is an example screenshot from an interactive streaming application depicting a selection of play highlights according to an implementation.
Figure 6B:
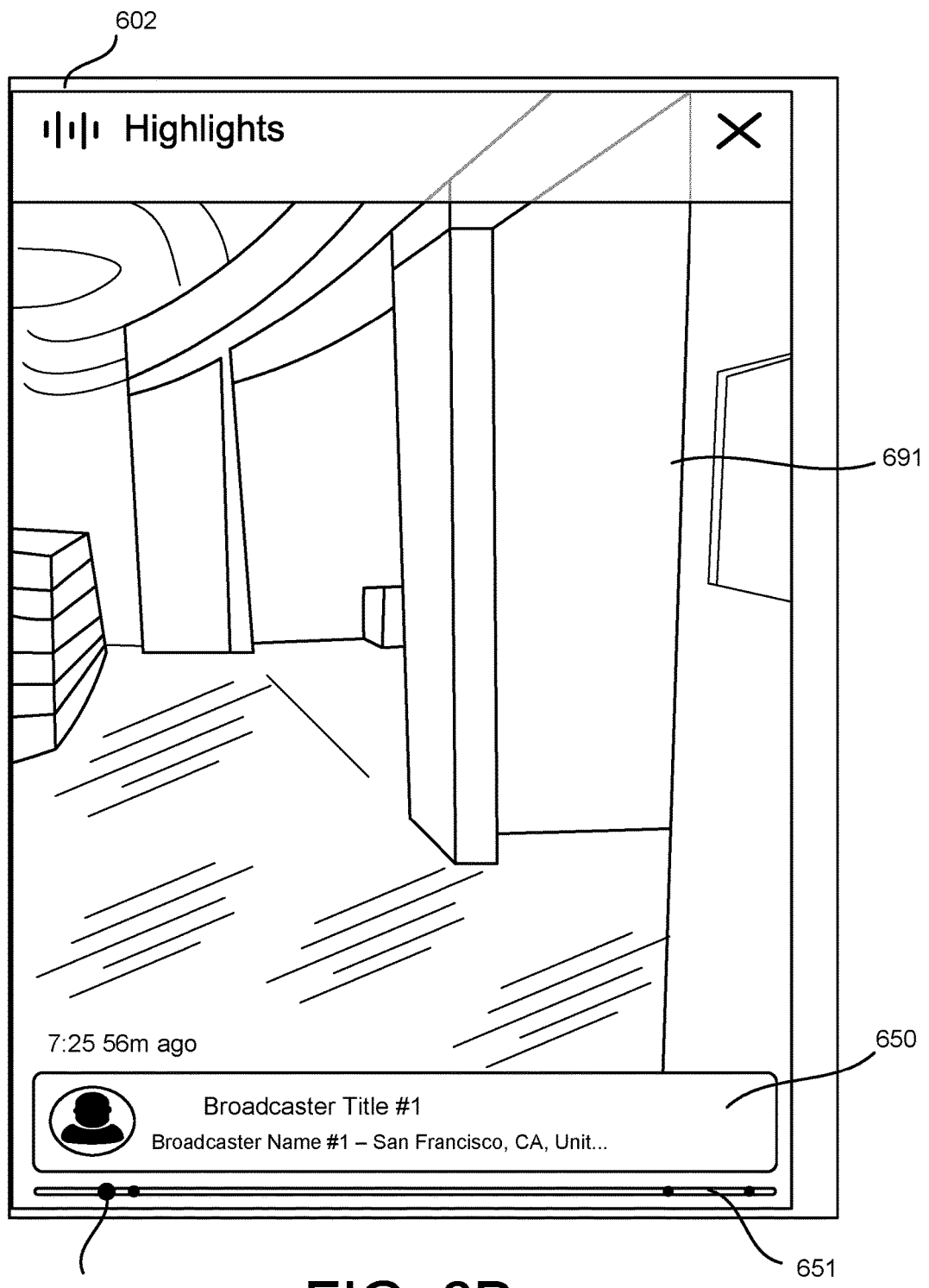
FIG. 6B is an example screenshot from the interactive streaming application depicting playback of highlights from a video broadcast stream according an implementation.

FIGS. 6A-6E illustrate various example screenshots of a user interface of the interactive streaming application 132, 532 or 732 according to various implementations. FIG. 6A is an example of a screenshot 601 depicting a selection of play highlights 682, and a list of suggested video broadcast streams 690. In this example, the list of video broadcast streams 690 includes 27 recent video broadcast streams. Upon selection of play highlights 682, the interactive streaming application 132 initiates playback of the video highlights 181 starting with the highlights from one of the video broadcast streams provided on the list. FIG. 6B is a screenshot 602 depicting playback of the highlights from a first video broadcast stream 691. Also, as shown in FIG. 6B, the user interface of the interactive streaming application 132 depicts a timeline 651 of the first video broadcast stream 691, and a highlight indicator 652 indicating a temporal location of the highlights in the context of the full broadcast. Also, during play of the highlights, the user interface may display information block 650 providing background information about the broadcast (e.g., title, broadcaster, location, time, etc.).

Figure 6C:
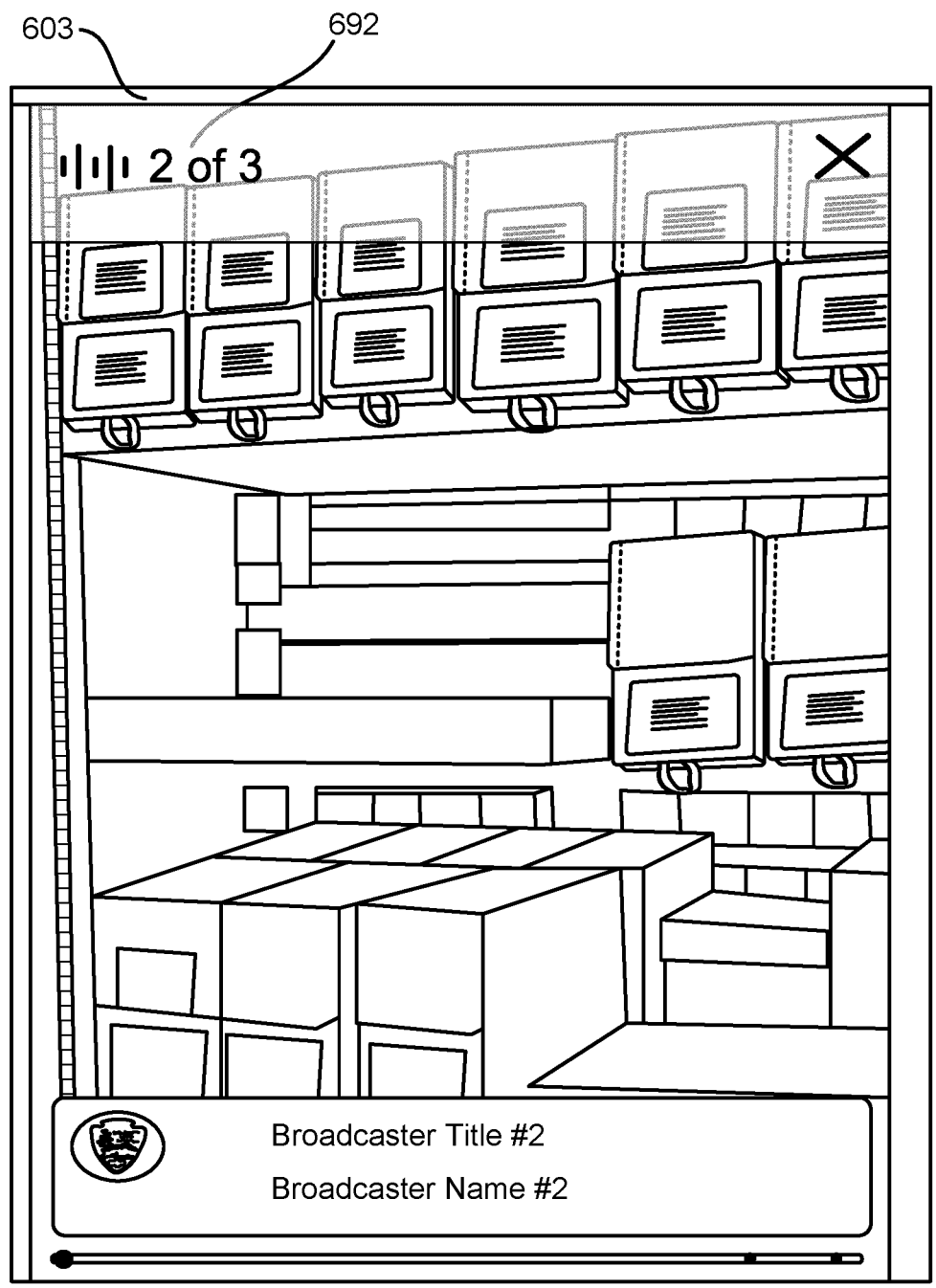
FIG. 6C is an example screenshot from the interactive streaming application depicting playback of highlights from a next video broadcast stream according to an implementation.
Figure 6D:
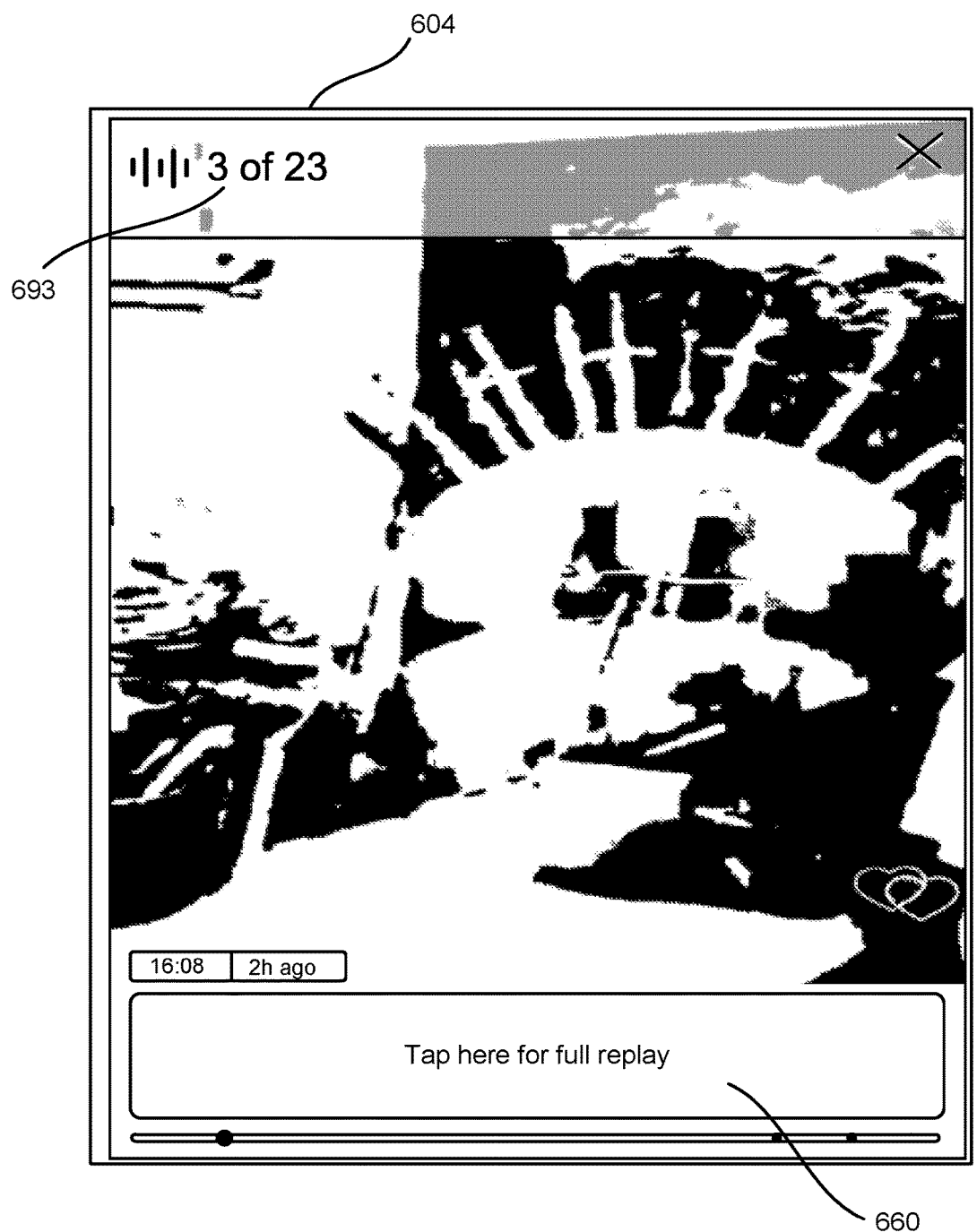
FIG. 6D is an example screenshot from the interactive streaming application depicting playback of highlights from a next video broadcast stream according to an implementation.
Figure 6E:
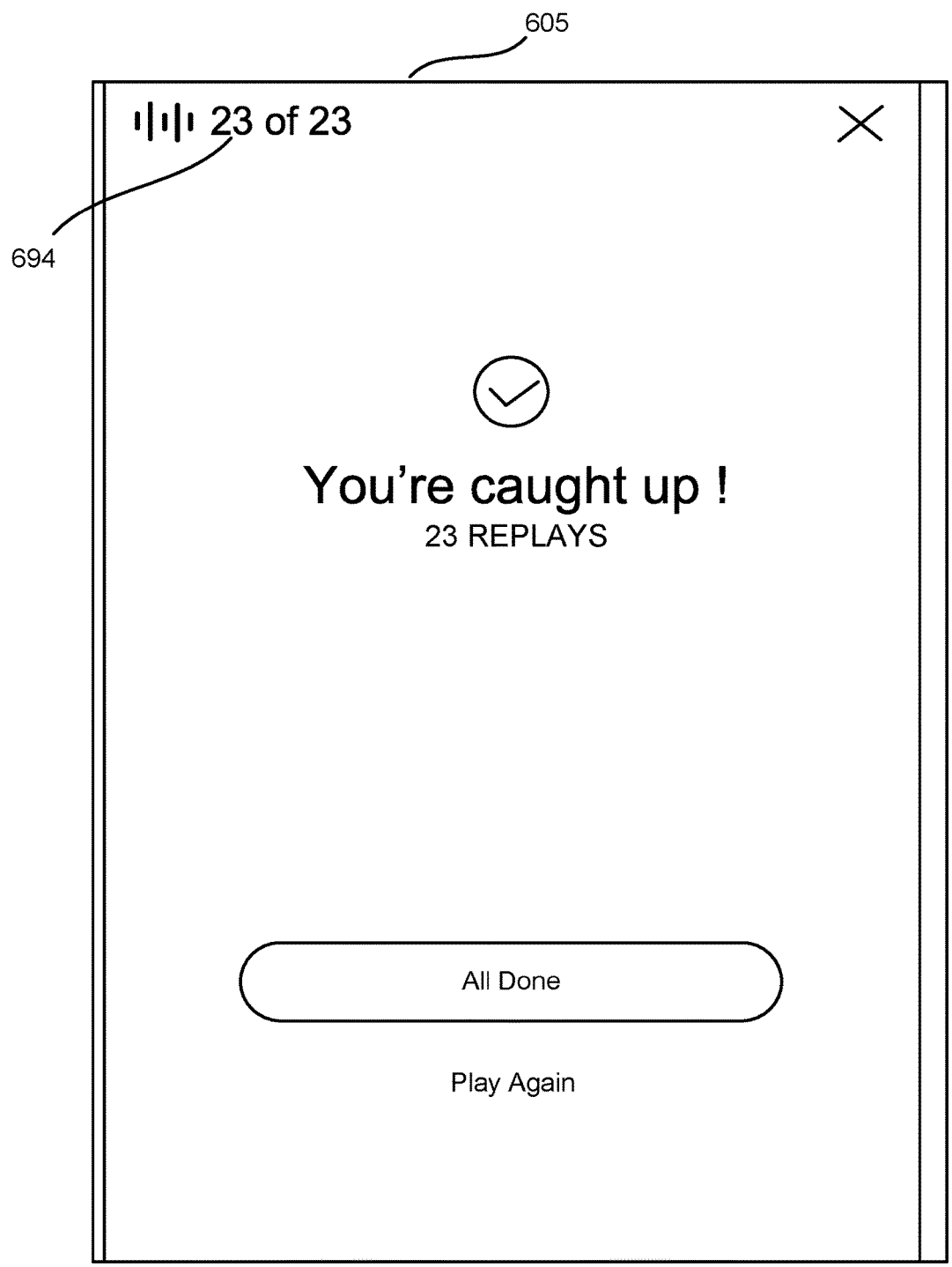
FIG. 6E is an example screenshot from the interactive streaming application depicting the end of the highlights according to an implementation.

In some examples, at the end of the first video broadcast stream's highlights, the user may provide a gesture on the user interface (e.g., swipe to the left), which plays the highlights from the next video broadcast stream. FIG. 6C is a screenshot 603 depicting playback of the highlights from a next video broadcast stream 692. FIG. 6D is a screenshot 604 depicting playback of the highlights from a next video broadcast stream 693. In some examples, the interactive streaming application may provide a user-selectable option 660 to replay the full broadcast. In some examples, while the highlights are played back (or at the end of the highlights), the user may select the user-selectable option 660 to replay the full broadcast. This process may continue until all the highlights are viewed. FIG. 6E is a screenshot 605 depicting the end of the highlights of the last video broadcast stream 694, which the user has the option of playing again or being done with the highlights.

Figure 7:
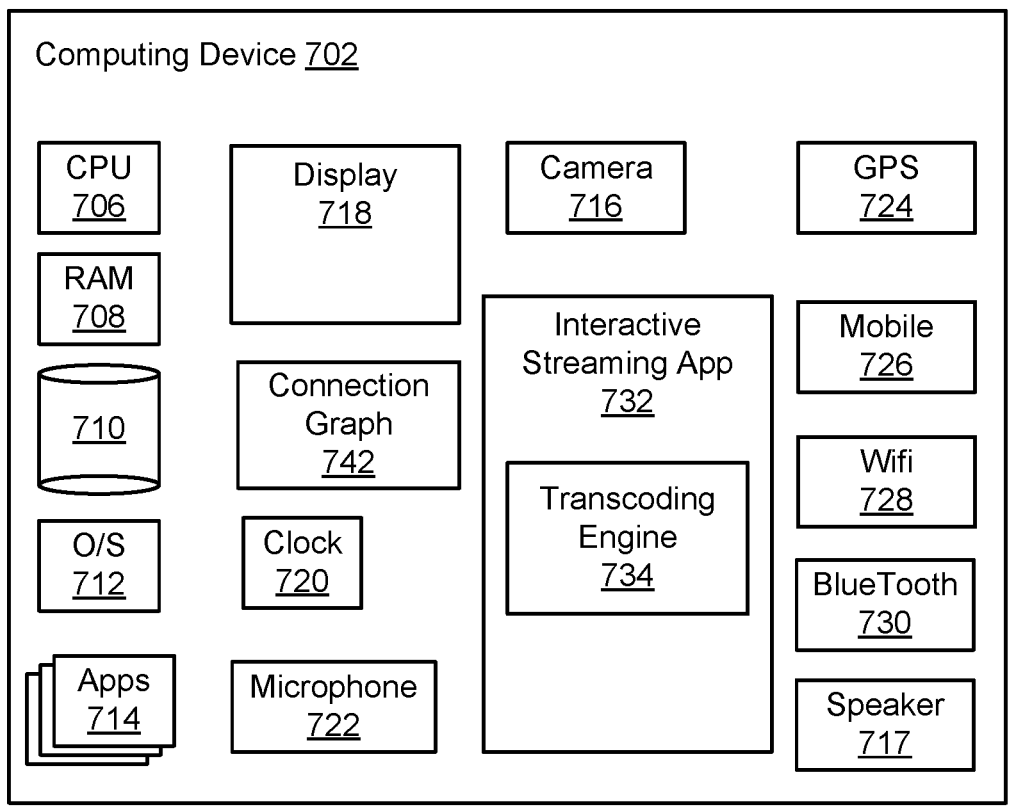
FIG. 7 is a schematic diagram of a computing device according to another implementation.

FIG. 7 is a schematic diagram of a computing device 702 according to another implementation. In some examples, the computing device 702 is the broadcasting device 102a of FIG. 1. In some examples, the computing device 702 is the viewing device 102b of FIG. 1.

As shown in FIG. 1, the computing device 702 may include one or more processors 706 (e.g., a processor formed in a substrate, such as a central processing unit, a graphics processor, etc.), a volatile memory 708, and nonvolatile memory 710. The volatile memory 708 may store, for example, instructions that are executed by the processor(s) 706, and the nonvolatile memory 710 may store, for example, various user data, instructions for executing an operating system, applications, etc.

The computing device 702 may include a plurality of applications 714, which can be executed by the computing device 702 (e.g., by the processor 706 executing one or more instructions stored in memory 708 or 710 that correspond to the application) and which may communicate with the operating system 712 (e.g., through one or more application programming interfaces (APIs)). Execution of the applications 714 can provide various functionalities to a user of the computing device 702. In a few examples, an email application may, with a user's permission, provide access to the user's email account and email messages associated with the account. A browser application may provide a Web browser to a user, so that the user may access content that can be loaded into, and displayed by, the browser application. A social network application can provide content to the user from contacts and sources that the user has chosen to be associated with within the social media platform associated with the social network application. A camera application can provide access to use of a camera 716 within the computing device 702 for capturing still pictures or video. In some implementations, the camera 716 may be external to the computing device 702, such as a camera that communicates wirelessly, e.g., via BLUETOOTH or Wi-Fi, with the computing device 702. Applications that provide a rich variety of other functionalities and information to the user also can be provided. In some implementations, the interactive streaming application 732 may be considered one of the applications 714. Referring to FIGS. 1 and 7, in some examples, the interactive streaming application 132 is the interactive streaming application 732.

The computing device 702 includes a display 718 (e.g., a touchscreen display, an LED display, etc.) that can display a user interface for an application 714 that is being executed by the device. More than one application can be executed at a time. However, in some implementations (e.g., in the case of a smart phone), the size of the display is better suited for a single executing application to be displayed at a time. The executing application that is displayed on the display 718 can be referred to as a "front-facing" application. In some implementations, the display 718 may be housed in a structure separate from a structure housing one or more of the other components of the computing device 702 (e.g., the display 718 is a stand-alone display).

The computing device 702 may include internal speakers 717 that can provide an audio output from the device. The computing device 702 may also include a port or interface (e.g., USB, micro-USB, cable interfaces, HDMI, wireless interface, etc.) that can be used to connect the computing device 702 to external devices, e.g., speakers that may provide an audio output when connected to the device 702 or other types of sensors, cameras, or computing devices. The computing device 702 may also include a microphone 722 that detects sound in the environment of the computing device 702. In some implementations, the microphone 722 may be external to the computing device 702. The microphone 722, whether internal or external, may provide audio for a live video stream.

The computing device 702 may also include a clock 720 that determines a time and date and may include a GPS transceiver 724 that communicates with a global positioning system to determine a location of the computing device 702. The location may be provided as part of the metadata associated with a real-time video stream. The computing device 702 also includes various network interface circuitry, such as for example, a mobile network interface 726 through which the computing device 702 can communicate with a cellular network, a Wi-Fi network interface 728 with which the computing device 702 can communicate with a Wi-Fi base station, a BLUETOOTH network interface 730 with which the computing device 702 can communicate with other BLUETOOTH devices (e.g., an external camera, microphone, or speakers), and/or an Ethernet connection or other wired connection that enables the computing device 702 to access the network 150 of FIG. 1. The computing device 702 may include other sensors (not shown), such as, for example, an ambient light sensor, a temperature sensor, and/or an accelerometer, etc. In some examples, a connection graph 742 may be a subset of the connection graph 168 that resides on the server computer 160. A connection graph is a data structure representing relationships (i.e., connections) between one or more entities. For example, the connection graph 742 may be a data set that stores relationships between social media accounts. Relationships may include friending, following, linking, or some other relationship. An entity is directly connected to another entity in the connection graph 742 when the two entities are connected by a path length of one, i.e., there are no intervening nodes.

After receiving a request from the user who wants to begin a broadcast, the interactive streaming application 732 may be configured to use various components of the computing device 702 or components in communication with computing device 702 to capture and send a real-time video stream and to display interactions (e.g., engagement representations) from viewers of the real-time video stream. For example, the interactive streaming application 732 may use the camera 716, the GPS 724 (or other location-obtaining sensors), and the microphone 722 of the computing device 702 to capture a real-time video stream with audio. In some implementations, the GPS 724 may associate a location with the real-time video stream.

Referring to FIGS. 1 and 7, in some examples, the interactive streaming application 732 may include a transcoding engine 734, which may be configured to determine the throughput between the computing device 702 and the server computer 160 via the network 150. The throughput represents the bandwidth available to transmit the real-time video stream from the computing device 702 to the server computer 160. When bandwidth is low, the transcoding engine 734 is configured to reduce the video quality sent to the server computer 160. This differs from conventional streaming systems where the server computer 160 determines the video quality sent to each viewer based on the viewer's connection. In contrast, the interactive streaming application 732 decides the video quality for all viewers based on the bandwidth available to the computing device 702. This ensures that latency is kept low, e.g., a few seconds or less. The low latency ensures that engagements are relevant to the broadcaster—in other words, the broadcaster receives almost real-time engagements. A latency of more than a few seconds, and certainly a latency of 30 seconds or more would make engagements too old to provide effective communication between the broadcaster and the viewers.

In some examples, referring to FIGS. 1 and 7, the interactive streaming application 732 may also be configured to attach a timestamp packet to the frames of the real-time video stream provided from the computing device 702 to the server computer 160. This special packet enables the server computer 160 to associate an engagement with a particular time in the live feed broadcast. The interactive streaming application 732 may also be configured to use one of the computing components (e.g., Wi-Fi network interface 728, mobile network interface 726, etc.) to provide the real-time video stream, over the network 150, to the interactive video broadcasting service 101. The interactive streaming application 732 may also be configured to receive engagement indications as well as metadata about the real-time video stream from the server computer 160. The engagement indications may be in a data stream that is associated with the video stream. The metadata may include information such as how many viewers have joined the real-time video stream and are currently viewing the video stream. The engagement indications may represent feedback and information from the viewers of the video stream. For example, the engagements may include comments, signals of appreciation, share notifications, viewer join notifications, etc. The interactive streaming application 732 may be configured to receive the data stream and to generate representations of the engagement indications in the data stream and provide the representations to the display 718.

The interactive streaming application 732 may be configured to trigger the display of the icons (e.g., representations of signals of appreciation) for a predetermined period of time. For example, each icon may appear on the display 718 of the computing device 702 for three or five seconds and then disappear or fade out. The engagement may be associated with a specific time, e.g., a timestamp from a timestamp packet in the video stream, and an engagement may be displayed during a period that starts at the timestamp until the predetermined period of time expires. In some implementations, the interactive streaming application 732 may be configured to animate the icons on the display 718 while displayed. For example, the interactive streaming application 732 may cause the icons to move from a first location to a second location during the predetermined period of time. The movement need not be linear, but may be in a general direction. For instance, the icon may float up or sink down a side edge of the display 718 or move generally across a top or bottom edge of the display 718 during the predetermined time. The interactive streaming application 732 may be configured to display and animate a plurality of the icons, each icon representing a single signal of appreciation. The icons may overlap with each other in the display.

Figure 8:
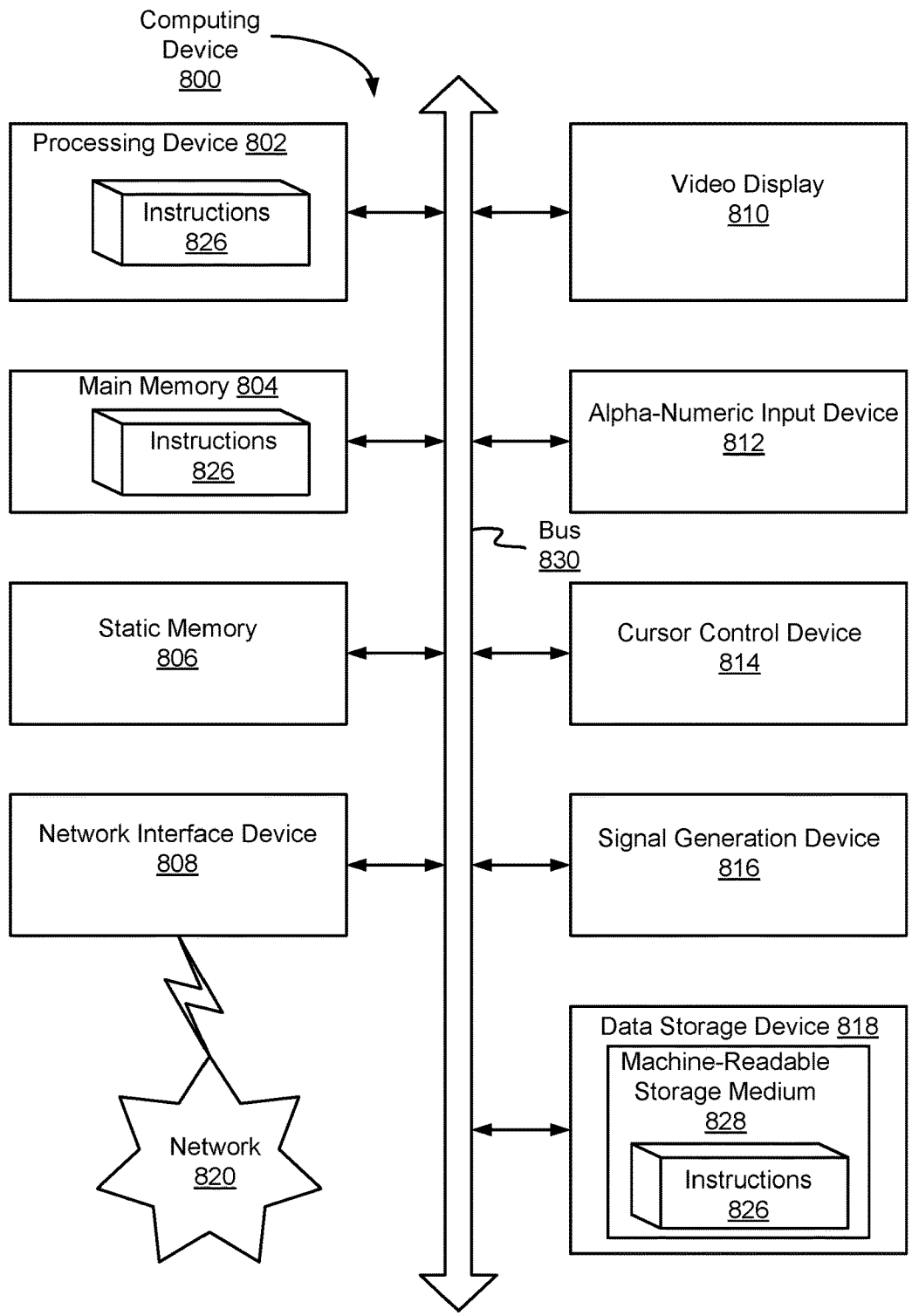
FIG. 8 is a schematic diagram of a machine in the example form of a computing device within which a set of instructions, for causing the machine to perform any one or more of the functions of the interactive video broadcasting service of FIG. 1 according to an implementation.

FIG. 8 is a diagrammatic representation of a machine in the example form of a computing device 800 within which a set of instructions, for causing the machine to perform any one or more of the functions of the interactive video broadcasting service 101 executing on the server computer 160 of FIG. 1. The computing device 800 may be a rackmount server, a server computer, or a mainframe computer, within which a set of instructions, for causing the machine to perform any one or more of the functions with respect to the interactive video broadcasting service 101 discussed herein, including the video highlight creation operations discussed with reference to the figures. In some examples, the computing device 800 may operate in the capacity of a server machine in client-server network environment. Further, while only a single machine is illustrated, the term "machine" shall also be taken to include any collection of machines that individually or jointly execute a set (or multiple sets) of instructions to perform any one or more of the functions of the interactive video broadcasting service 101 discussed herein.

In some examples, the computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

In some examples, processing device 802 represents one or more processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the functions and steps discussed herein (e.g., instructions for sharing live-feed video streams and video highlight creation).

In some examples, the computing device 800 may further include a network interface device 808 which may communicate with a network 820. In some examples, the network 820 may be the network 150 of FIG. 1. In some examples, the computing device 800 may be associated with a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 816 (e.g., a speaker). In some examples, the video display unit 810, the alphanumeric input device 812, and the cursor control device 814 may be combined into a single component or device (e.g., an LCD touch screen).

The data storage device 818 may include a computer-readable storage medium 828 on which is stored one or more sets of instructions 826 embodying any one or more of the methodologies or functions described herein (e.g., instructions for sharing live-feed video streams and video highlight creation). The instructions 826 may also reside, completely or at least partially, within the main memory 804 and/or within the processing device 802 during execution thereof by the computing device 800, the main memory 804 and the processing device 802 also constituting computer-readable media. In some examples, the instructions may further be transmitted or received over the network 820 via the network interface device 808.

While the computer-readable storage medium 828 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining," "creating," "providing," "classifying," "assigning," "selecting," "applying," "sorting," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

According to an implementation, a computing device for automatically creating video highlights for video broadcast streams shared in a social media platform includes at least one processor, and a non-transitory computer-readable medium having executable instructions that when executed by the at least one processor are configured to execute a video broadcasting service. The video broadcasting service configured to obtain a video broadcast stream that was previously broadcasted to a plurality of viewing devices of the social media platform, create video highlights based on an analysis of the video broadcast stream, and provide the video highlights for selection within a user interface of an interactive streaming application configured to communicate with the video broadcasting service over a network.

The computing device may include a classify configured to classify one or more of a plurality of video segments of the video broadcast stream, and assign a confidence score to each classified video segment, where the confidence score indicates a likeliness of a respective video segment having its classification. The video broadcasting service configured to calculate a ranking score for each classified video segment based on the confidence scores, and select one or more of the plurality of video segments to be included within the video highlights based on the ranking scores. The video broadcasting service is configured to apply weights to the confidence scores, and calculate the ranking score based on the weighted confidence scores. The video broadcasting service is configured to select video segments having ranking scores above or equal to a threshold level. The video broadcasting service is configured to sort the selected video segments by temporal order, and include the sorted video segments within the video highlights. The video broadcast stream is associated with a user account of a user of the interactive streaming application.

The video broadcasting service is configured to obtain multiple video broadcast streams associated with a user account of a user of the interactive streaming application. The multiple video broadcast streams include a first video broadcast stream and a second video broadcast stream. The video broadcasting service is configured to obtain at least one first video segment from the first video broadcast stream, and at least one second video segment from the second video broadcast stream, and the video broadcasting service is configured to combine the at least one first video segment and the at least one second video segment into the video highlights. The video broadcasting service is configured to obtain engagement data associated with the video broadcast stream, and the video highlight creator configured to create the video highlights based on the engagement data. The engagement data includes signals of appreciation, comments, joins, or shares. The video broadcasting service is configured to obtain social media engagements from a social media platform different than the social media platform that broadcasted the video broadcasting stream, and the video broadcasting service configured to create the video highlights based on the social media engagements.

According to an aspect, a computing device for incorporating video highlights of video broadcast streams shared in a social media platform, may include a display device, at least one processor, and a non-transitory computer-readable medium having executable instructions that when executed by the at least one processor are configured to execute an interactive streaming application. The interactive streaming application configured to provide a display of a list of video broadcast streams associated with a user account of a user of the interactive streaming application, where the list of video broadcast streams includes a first video broadcast stream and a second video broadcast stream, provide a selection for video highlights, the video highlights including at least one first video segment of the first video broadcast stream and at least one second video segment of the second video broadcast stream, and initiate playback of the video highlights, upon receiving an indication that the selection for video highlights has been selected, such that the user can view highlights of the first video broadcast stream and the second video broadcast stream.

During playback of the video highlights, the interactive streaming application is configured to provide a user-selectable option to initiate playback of the second video broadcast stream. During the playback of the video highlights, the interactive streaming application is configured to display the at least one first video segment of the first video broadcast stream, and, at an end of the at least one first video segment, and upon receiving an indication of a gesture on a user interface of the interactive streaming application, the interactive streaming application is configured to display the at least one second video segment of the second video broadcast stream. During playback of the at least one first video segment of the first video broadcasting stream, the interactive streaming application is configured to display a timeline of the first video broadcasting stream, and an indication of a temporal location of the at least one first video segment on the timeline of the first video broadcasting stream.

A method for automatically creating video highlights for video broadcast streams shared in a social media platform may include obtaining, by at least one processor, a video broadcast stream that was broadcasted to a plurality of viewing devices in the social media platform, creating, by the at least one processor, video highlights based on an analysis of the video broadcast stream by classifying one or more of a plurality of video segments of the video broadcast stream based on an analysis of each video segment, assigning a confidence score to each classified video segment, the confidence score indicating a likeliness of a respective video segment having its classification, calculating a ranking score for each classified video segment based on the confidence scores, and selecting one or more of the plurality of video segment to be included within the video highlights based on the ranking scores, and providing, by the at least one processor, the video highlights for selection within a user interface of an interactive streaming application.

The creating includes applying weights to the confidence scores, calculating the ranking score based on the weighted confidence scores, and selecting video segments having ranking scores above or equal to a threshold level. The creating includes sorting the selected video segments by temporal order, and including the sorted video segments within the video highlights. The video broadcast stream is associated with a broadcaster that is linked to a user account of a user of the interactive streaming application. The creating includes selecting at least one first video segment from a first video broadcast stream, selecting at least one second video segment from a second video broadcast stream, and combining the at least one first video segment and the at least one second video segment into the video highlights. The method may include providing a display of a list of video broadcast streams associated with a user account of a user of the interactive streaming application, where the list of video broadcast streams includes a first video broadcast stream and a second video broadcast stream, providing a selection for video highlights within a context of the user interface of the interactive streaming application, and initiate playback of the video highlights, upon receiving an indication that the selection of video highlights has been selected, such that the user can view highlights of the first video broadcast stream and the second video broadcast stream.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

What is claimed is:

1. A computing device for automatically creating video highlights for video broadcast streams shared in a social media platform, the computing device comprising:
    at least one processor; and
    a non-transitory computer-readable medium having executable instructions that when executed by the at least one processor are configured to execute a video broadcasting service having a video highlight creator, the video highlight creator configured to:
        obtain a video broadcast stream that was previously broadcasted to a plurality of viewing devices of the social media platform;
        create video highlights based on a video analysis of the video broadcast stream, including;
            classify, using a machine-learning classifier, a plurality of video segments of the video broadcast stream into classifications, each classification having a tag indicating whether the classification is highlight-eligible or not highlight-eligible;
            select at least one of the plurality of video segments based on the tags and class proportion data, the class proportion data indicating frequencies in which the classifications appear in a set of video broadcast streams; and
        provide the video highlights for selection within a user interface of an interactive video streaming application configured to communicate with the video broadcasting service over a network.

2. The computing device of claim 1, wherein the video highlight creator is configured to:
    assign a confidence score to each classified video segment, the confidence score indicating a likeliness of a respective video segment having a particular classification;
    calculate a ranking score for each classified video segment based on the confidence scores; and
    select one or more of the plurality of video segments to be included within the video highlights based on the ranking scores.

3. The computing device of claim 2, wherein the video highlight creator is configured to apply weights to the confidence scores, and calculate the ranking score based on the weighted confidence scores.

4. The computing device of claim 2, wherein the video highlight creator is configured to select video segments having ranking scores above or equal to a threshold level.

5. The computing device of claim 2, wherein the video highlight creator is configured to sort the selected video segments by temporal order, and include the sorted video segments within the video highlights.

6. The computing device of claim 1, wherein the video highlight creator is configured to obtain multiple video broadcast streams associated with a user account of a user of the interactive video streaming application, the multiple video broadcast streams including a first video broadcast stream and a second video broadcast stream, the video highlight creator is configured to obtain at least one first video segment from the first video broadcast stream, and at least one second video segment from the second video broadcast stream, the video highlight creator is configured to combine the at least one first video segment and the at least one second video segment into the video highlights.

7. The computing device of claim 1, wherein the video highlight creator is configured to obtain engagement data associated with the video broadcast stream, the engagement data including signals of appreciations received from viewers with respect to one or more of the video segments, the video highlight creator configured to select the at least one video segment based on the engagement data, the tags, and the class proportion data.

8. The computing device of claim 7, wherein the engagement data also includes comments received from the viewers with respect to one or more of the video segments.

9. The computing device of claim 1, wherein the video highlight creator is configured to obtain social media engagements from a social media platform different than the social media platform that broadcasted the video broadcasting stream, the video highlight creator configured to create the video highlights based on the social media engagements.

10. A social media system for sharing video broadcast streams in a social network, the social media system comprising:
an interactive video streaming application executable by at least one processor, and configured to display a timeline of social content on a user interface of the interactive video streaming application, the timeline including a list of video broadcast streams, the list of video broadcast streams including a first video broadcast stream and a second video broadcast stream; and
at least one server configured to:
classify, using a machine-learning classifier, video segments of the first and second video broadcast streams into classifications, each classification having a tag indicating whether the classification is highlight-eligible or not highlight-eligible; and
select a subset of the video segments for the video highlights based on the tags and class proportion data, the class proportion data indicating frequencies in which the classifications appear in a set of video broadcast streams;
the interactive video streaming application configured to:
provide an icon on the user interface for selection of video highlights, the video highlights including a video clip having at least one first video segment of the first video broadcast stream and at least one second video segment of the second video broadcast stream; and
initiate playback of the video highlights, upon receiving an indication that the icon has been selected, such that the user can view highlights of the first video broadcast stream and the second video broadcast stream.

11. The social media system of claim 10, wherein, during playback of the video highlights, the interactive video streaming application is configured to provide a user-selectable option to initiate playback of the second video broadcast stream.

12. The social media system of claim 10, wherein, during the playback of the video highlights, the interactive video streaming application is configured to display the at least one first video segment of the first video broadcast stream, and, at an end of the at least one first video segment, and upon receiving an indication of a gesture on a user interface of the interactive streaming application, the interactive video streaming application is configured to display the at least one second video segment of the second video broadcast stream.

13. The social media system of claim 10, wherein, during playback of the at least one first video segment of the first video broadcasting stream, the interactive video streaming application is configured to display a timeline of the first video broadcasting stream, and an indication of a temporal location of the at least one first video segment on the timeline of the first video broadcasting stream.

14. A method for automatically creating video highlights for video broadcast streams shared in a social media platform, the method comprising:
obtaining, by at least one processor, a video broadcast stream that was broadcasted to a plurality of viewing devices in the social media platform;
creating, by the at least one processor, video highlights based on an analysis of the video broadcast stream, including:
classifying, using a machine-learning classifier, a plurality of video segments of the video broadcast stream into classifications based on a video analysis of each video segment, each classification having a tag indicating whether the classification is highlight-eligible or not highlight-eligible;
assigning a confidence score to each classified video segment, the confidence score indicating a likeliness of a respective video segment having a particular classification;
calculating a ranking score for each classified video segment based on the confidence scores; and
selecting one or more of the plurality of video segments to be included within the video highlights based on the ranking scores, the tags, and class proportion data, the class proportion data indicating frequencies in which the classifications appear in a set of video broadcast streams; and
providing, by the at least one processor, the video highlights for selection within a user interface of an interactive streaming application.

15. The method of claim 14, wherein the creating includes applying weights to the confidence scores, calculating the ranking score based on the weighted confidence scores, and selecting video segments having ranking scores above or equal to a threshold level.

16. The method of claim 14, wherein the creating includes sorting the selected video segments by temporal order, and including the sorted video segments within the video highlights.

17. The method of claim 14, wherein the creating includes selecting at least one first video segment from a first video broadcast stream, selecting at least one second video segment from a second video broadcast stream, and combining the at least one first video segment and the at least one second video segment into the video highlights.

18. The social media system of claim 10, wherein the at least one server is configured to:
- assign a confidence score to each classified video segment, the confidence score indicating a likeliness of a respective video segment having a particular classification;
- calculate a ranking score for each classified video segment based on the confidence scores; and
- select the subset of the video segments for the video highlights based on the ranking scores.

* * * * *